US011755615B2

(12) United States Patent
Santiago et al.

(10) Patent No.: US 11,755,615 B2
(45) Date of Patent: Sep. 12, 2023

(54) DISTRIBUTED DATA MANAGEMENT SYSTEM AND METHOD

(71) Applicant: THE BOEING COMPANY, Chicago, IL (US)

(72) Inventors: Rodolfo A. Santiago, Bellevue, WA (US); Claudiu Bogdan Sherry Danilov, Cypress, CA (US); Greg Kimberly, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 228 days.

(21) Appl. No.: 15/726,927

(22) Filed: Oct. 6, 2017

(65) Prior Publication Data

US 2019/0108268 A1 Apr. 11, 2019

(51) Int. Cl.
  *G06F 16/27* (2019.01)
  *G06F 16/178* (2019.01)
  *H04L 67/1097* (2022.01)
  *H04W 4/38* (2018.01)

(52) U.S. Cl.
  CPC ........... *G06F 16/27* (2019.01); *G06F 16/178* (2019.01); *G06F 16/273* (2019.01); *H04L 67/1097* (2013.01); *H04W 4/38* (2018.02)

(58) Field of Classification Search
  None
  See application file for complete search history.

(56) References Cited

U.S. PATENT DOCUMENTS

| 8,719,225 B1 | 5/2014 | Rath |
| 9,069,827 B1 * | 6/2015 | Rath ................. G06F 16/25 |
| 9,244,958 B1 | 1/2016 | Maccanti et al. |

(Continued)

FOREIGN PATENT DOCUMENTS

| CN | 105991752 A | 10/2016 |
| CN | 106105370 A | 11/2016 |
| CN | 106790565 A | 5/2017 |

OTHER PUBLICATIONS

Yih Hu; Packet Leashes: A Defense against Wormhole Attacks in Wireless Networks; IEEE; 2003; pp. 1976-1986 (Year: 2003).*

(Continued)

*Primary Examiner* — Albert M Phillips, III
*Assistant Examiner* — Jermaine A Mincey
(74) *Attorney, Agent, or Firm* — Moore IP Law

(57) ABSTRACT

A computing device includes an interface configured to communicate with a second computing device, a memory configured to store a first copy of a file that is synchronized with a second copy of the file stored at the second computing device, and a processor. The processor is configured, in response to receiving an update to the file while the interface is unable to communicate with the second computing device, to access versioning management data indicating synchronization settings associated with each of a plurality of files that includes the file. The processor is configured to, conditioned on determining that the versioning management data indicates a first synchronization setting associated with the file, write the update to the first copy, and conditioned on determining that the versioning management data indicates a second synchronization setting associated with the file, refrain from writing the update to the first copy.

20 Claims, 11 Drawing Sheets

(56) References Cited

U.S. PATENT DOCUMENTS

| | | | | |
|---|---|---|---|---|
| 2005/0144186 | A1* | 6/2005 | Hesselink | H04L 63/0209 |
| 2010/0250507 | A1* | 9/2010 | Omara | G06F 16/9024 |
| | | | | 707/704 |
| 2011/0196866 | A1* | 8/2011 | Cooper | G06F 16/284 |
| | | | | 707/E17.073 |
| 2013/0097458 | A1* | 4/2013 | Sekino | G06F 11/1441 |
| | | | | 714/6.3 |
| 2014/0129519 | A1 | 5/2014 | Leshchiner | |
| 2014/0324785 | A1 | 10/2014 | Gupta et al. | |
| 2016/0063083 | A1* | 3/2016 | Mu | H04L 47/828 |
| | | | | 709/227 |
| 2016/0117304 | A1* | 4/2016 | Graham | H04L 67/1097 |
| | | | | 715/224 |
| 2016/0182647 | A1* | 6/2016 | Alger | H04L 67/16 |
| | | | | 709/227 |
| 2017/0270136 | A1* | 9/2017 | Chen | G06F 16/13 |
| 2018/0157833 | A1* | 6/2018 | Chelarescu | G06F 21/6218 |
| 2019/0081766 | A1* | 3/2019 | Luo | H04B 1/525 |

OTHER PUBLICATIONS

Ghemawat, S., et al., "The Google File System," 19th ACM Symposium on Operating Systems Principles, Oct. 19-22, 2003, Bolton Landing, New York, 15 pgs.
Distributed Replicated Block Device: <http://docs.linbit.com/> LinBit The DRBD9 Users Guide, downloaded Oct. 3, 2017, 159 pgs.
<https://www.gluster.org>, Docs—Getting started with GlusterFS—Quick Start Guide, downloaded Oct. 3, 2017, 4 pgs.
<http://clusterlabs.org/doc/>, ClusterLabs Pacemaker Documentation, downloaded Oct. 3, 2017, 5 pgs.
Extended European Search Report for Application No. 18198646.4 dated Nov. 30, 2018, 9 pgs.
Dake, Steven C., et al., "The Corosync Cluster Engine," Proceedings of the Linux Symposium, vol. 1, Jul. 23-26, 2008, pp. 1-18.
DRBD Users Guide 8.0-8/3—"Split brain notification and automatic recovery notification" http://www.drbd.org/en/doc/users-guide-83/s-split-brain-notification-and-recovery, pp. 1-6.
GIT—everything-is-local, https://git-scm.com/, retrieved Sep. 16, 2020, pp. 1-2.
Moser, L. E. et al., "Extended Virtual Synchrony," ACM Transactions on Computer Systems, vol. 13, No. 4, 1994, pp. 1-10.
Reisner, Philipp et al, "DRBD v8 Replicated Storage with Shared Disk Semantics," Proceedings of the 12th International Linux System Technology Conference, Sep. 18, 2005, pp. 1-11.
The Spread Toolkit, http://spread.org/, retrieved Sep. 16, 2020, 1 pg.
Communication pursuant to Article 94(3) EPC for Application No. 18198646.4 dated Nov. 11, 2020, 8 pgs.
Summons to attend oral proceedings pursuant to Rule 115(1) EPC dated Apr. 20, 2022, 9 pgs.
Wiesmann M et al: "Understanding replication in databases and distributed systems", Distributed Computing Systems, 2000, Proceedings. 20th International Conference on Taipei,Taiwan Apr. 10-13, 2000, Los Alamitos, CA, USA,IEEE Comput. Soc, US, Apr. 10, 2000 (Apr. 10, 2000), pp. 464-474.
Chinese Office Action for Application No. 2018111098849 dated Mar. 1, 2023, pp. 1-19.

\* cited by examiner

DISTRIBUTED DATA MANAGEMENT SYSTEM AND METHOD

FIELD OF THE DISCLOSURE

The present disclosure is generally related to a distributed data management system.

BACKGROUND

Distributed computer systems enable multiple devices in different locations to access shared services or shared data, such as via one or more network connections, and offer improved scalability as compared to centralized computer systems. One type of distributed computer system is a shared file system, in which group data is stored at a centralized server (or small group of servers). Because shared data is stored in a single (or a few) locations, shared file systems are susceptible to a single point of failure (or a small number of failure points).

Another type of distributed computer system is a distributed data storage system. In a distributed data storage system, group data is copied (e.g., replicated) and stored at multiple nodes, which enables the distributed data storage system to tolerate faults or network partitions using the replicated data. For this reason, distributed data storage systems have been used as the basis for enterprise distributed systems, such as clusters of computers in data centers. These enterprise distributed systems typically include a large number of individual nodes (e.g., devices) that are connected via one or more relatively secure networks.

In order to maintain consistency between the group data on multiple nodes, a synchronization policy may be set by a human network administrator. The synchronization policy may allow a group of nodes of the enterprise distributed system to continue operating when one or more nodes are powered down or are partitioned, as long as a particular number of nodes (e.g., a quorum) remain in the group. The remaining nodes of the group may continue updating and replicating the group data, and when a node is returned to the group, the returning node performs data reconciliation by retrieving a copy of the group data stored at one of the other nodes and overwriting any group data at the returning node with the retrieved copy. By copying the group data from another node of the group, the returning node is prevented from having divergent group data, although at the cost of losing any data generated or received by the returning node while the node was disconnected from the group.

Such "one size fits all" synchronization and reconciliation policies may work well in enterprise distributed systems, such as data centers, that include a large number of nodes, a relatively stable network, and a human network administrator to perform some management operations. However, a particular synchronization and reconciliation policy may be insufficient in distributed data management systems that do not have the same characteristics. For example, a distributed data management system in an avionics environment (e.g., an airplane system) may be characterized by fewer nodes, a less stable network, unplanned or abrupt power down and power up operations, multiple nodes joining the system at the same time, independent/interruptible power circuits, little or no human network administration, and continued operation (for at least some applications) regardless of the number of nodes in the group. Additionally, for at least some applications, data loss during data reconciliation may negatively affect system performance. Due to these different operating conditions, enterprise distributed systems have not been expanded into some operating environments, such as vehicle-based systems or "Internet of Things" (IoT) devices.

SUMMARY

In a particular implementation, a computing device for a distributed data management system includes an interface configured to communicate with a second computing device of the distributed data management system, a memory configured to store a first copy of a file that is synchronized with a second copy of the file stored at the second computing device, and a processor. The processor is configured, in response to receiving an update to the file while the interface is unable to communicate with the second computing device, to access versioning management data indicating, for each particular file of a plurality of files that includes the file, a synchronization setting associated with the particular file. The processor is configured to, conditioned on determining that the versioning management data indicates a first synchronization setting associated with the file, write the update to the first copy of the file. The processor is also configured to, conditioned on determining that the versioning management data indicates a second synchronization setting associated with the file, refrain from writing the update to the first copy of the file.

In another particular implementation, a method of distributed data management includes storing, at a first computing device, a first copy of a file that is synchronized with a second copy of the file stored at a second computing device. The method further includes, in response to receiving an update to the file while communication with the second computing device is unavailable, accessing versioning management data indicating, for each particular file of a plurality of files that includes the file, a synchronization setting associated with the particular file. The method includes, conditioned on determining that the versioning management data indicates a first synchronization setting associated with the file, writing the update to the first copy of the file. The method further includes, conditioned on determining that the versioning management data indicates a second synchronization setting associated with the file, refraining from writing the update to the first copy of the file.

In another particular implementation, a distributed data management system includes a first computing device and a second computing device. The first computing device includes a first interface configured to communicate with a second interface of a second computing device, first memory configured to store a first copy of a file that is synchronized with a second copy of the file stored at the second computing device, and a first processor. The first processor is configured, in response to receiving a first update to the file while the first interface is unable to communicate with the second interface, to access a first copy of versioning management data indicating, for each particular file of a plurality of files that includes the file, a synchronization setting associated with the particular file. The first processor is configured to, conditioned on determining that the first copy of the versioning management data indicates a first synchronization setting associated with the file, write the first update to the first copy of the file. The first processor is further configured to, conditioned on determining that the first copy of the versioning management data indicates a second synchronization setting associated with the file, refrain from writing the first update to the first copy of the file. The second computing device includes the second interface configured to communicate with the first interface of the first computing device and second memory configured to store the second copy of the file.

DETAILED DESCRIPTION

Figure 1:
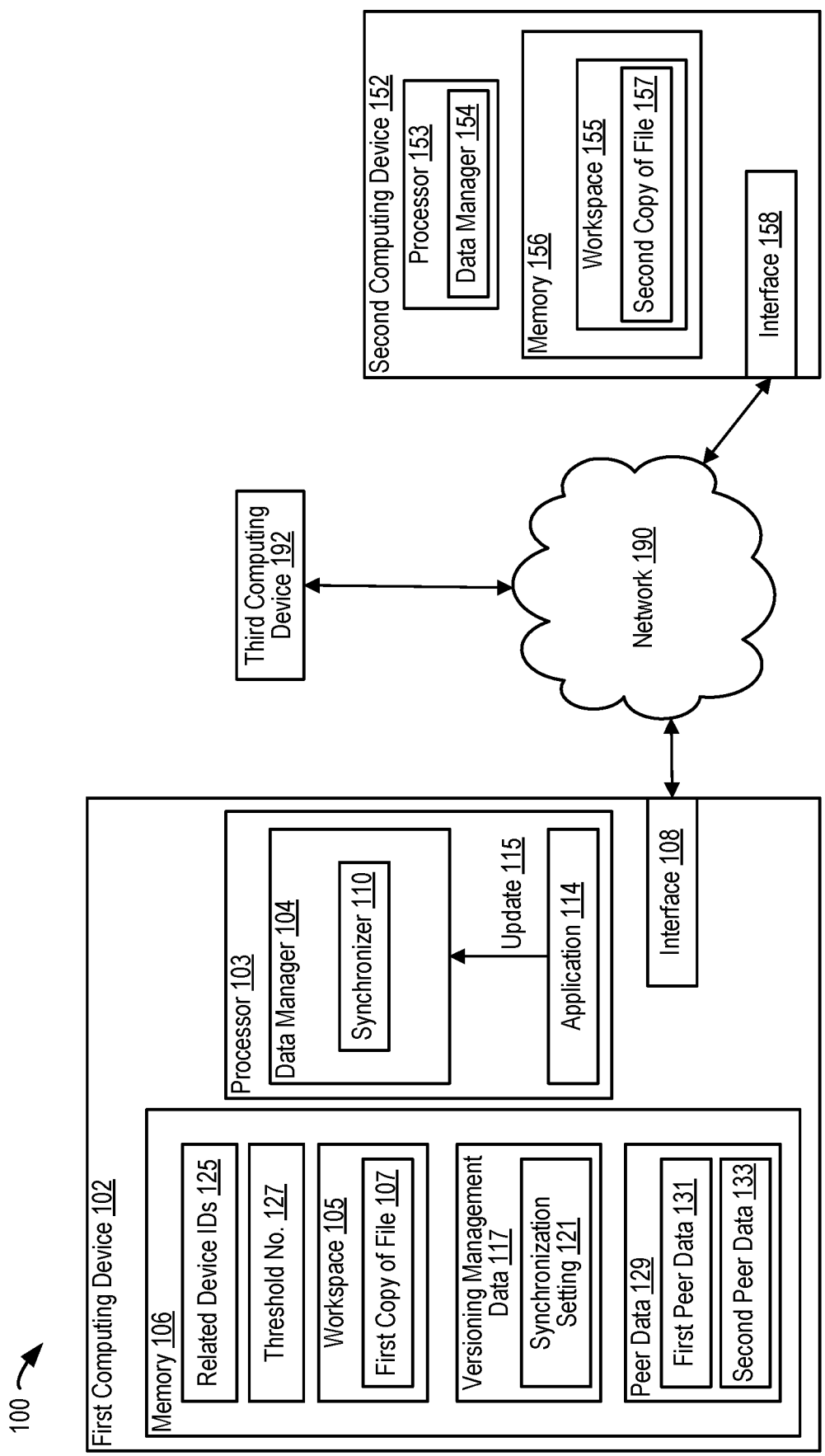
FIG. 1 is a block diagram that illustrates a particular implementation of a distributed data management system that synchronizes data on a per-directory or per-file basis.

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Implementations disclosed herein are directed to systems and methods for a distributed data management system, also referred to as a distributed versioned file system (DVFS). A distributed data management system, in accordance with aspects of the present disclosure can be implemented in environments with different characteristics than enterprise distributed systems, such as vehicle-based distributed systems or the "Internet of Things" (IoT). To illustrate, vehicle-based systems or IoT systems may be characterized by a small number of nodes, a relatively unstable network, unplanned power down and power up operations, multiple nodes joining the system at the same time, independent/interruptible power circuits, little or no human network administration, and continued operation (for at least some applications) regardless of the number of active nodes. Typical enterprise distributed systems are not suited for these environments. For example, quorum-based synchronization in enterprise distributed systems is inefficient in systems with a small number of nodes because the quorum will be difficult to maintain, resulting in large amounts of time that group data is locked. Additionally, enterprise distributed systems are designed to handle "graceful" power-ups and power-downs (e.g., having nodes leave the system one at a time or be added one at a time). In vehicle-based systems and IoT systems, nodes are more likely to join (or leave) the system unpredictably, including situations where multiple nodes may join the system concurrently. Typical enterprise distributed systems may be unable to prevent data divergence in these situations, and instead rely on a human network administrator to resolve data divergence. However, vehicle-based systems and IoT systems may not be able to rely on a human network administrator to solve data divergence issues.

Accordingly, a distributed data management system of the present disclosure is configured to select data synchronization and data reconciliation policies on a per-directory or per-file basis. Allowing selection of different policies at a finer granularity may enable the distributed data management system of the present disclosure to account for the above-described challenges associated with vehicle-based systems or IoT systems. To illustrate, a computing device of a distributed data management system includes an interface configured to communicate with a second device of the distributed data management system, a memory storing a first copy of a file that is synchronized with a second copy of a file stored at the second computing device, and a processor. The processor is configured to perform synchronization operations or reconciliation operations on a per-directory or per-file basis. For example, the processor is configured, in response to receiving an update to the file while the interface unable to communicate with the second computing device, to access versioning management data. The versioning management data indicates, for file of a plurality of files, a synchronization setting associated with the respective file. For example, the versioning management data may indicate synchronization settings for each directory of a synchronized workspace or for each individual file of the synchronized workspace. The processor is further configured to determine whether to write the update based on the version management data. For example, the processor may write the update to the first copy of the file if the versioning management data indicates a first synchronization setting associated with the file. Alternatively, the processor may refrain from writing the update if the version management data indicates a second synchronization setting associated with the file.

Because the synchronization settings are on a per-directory or per-file basis, some files (or directories) associated with higher data availability criteria or frequently updated data may be synchronized in accordance with a first synchronization scheme (e.g., a scheme that allows updates without a quorum) and other files (or directories) associated with less frequently updated data or higher data integrity criteria may be synchronized in accordance with a second scheme (e.g., a quorum-based scheme). Thus, computing devices of the distributed data management system of the present disclosure can execute applications having different criteria (e.g., high availability or high integrity) without additional hardware (e.g., dedicated hardware for each type of application). This flexibility enables the distributed data management system of the present disclosure to compensate for the varying applications of a vehicle-based system or IoT system, such as "critical" systems having a high data integrity criterion and service-based systems having a high availability criterion.

In some implementations, computing devices of the distributed data management system are configured to use a tree-based version management scheme for data reconciliation operations. To illustrate, each computing device may store data indicative of a tree of committed versions of a shared workspace. When a particular device is partitioned from the group, the device may continue to receive updates to files of a synchronized workspace. Each time the device commits the workspace (e.g., the state of the files) to a repository, the tree data is updated with a branch. When the device rejoins the group, the device may retrieve a copy of the shared workspace from one of the other devices of the group, and may store a new branch in the tree data. The device may determine a difference between the new branch and the previous branches (e.g., data that was added while the device was partitioned) and may provide the data to a corresponding application for a determination whether to include the data in a future update to the workspace. In this manner, automated application-level data reconciliation is performed without data loss, as compared to enterprise distributed systems in which data loss occurs during reconciliation (or a human network administrator intervenes). Thus, the distributed data management system of the present disclosure can be implemented in vehicle-based systems or IoT systems which have no (or little) human network administration.

FIG. 1 illustrates an example of a particular implementation of a system 100 (e.g., a distributed data management system) that synchronizes data on a per-directory or per-file basis. For example, different directories (e.g., a group of files) or different files may be synchronized according to different synchronization methodologies without requiring a human network administrator. Enabling data synchronization on a per-directory or per-file basis increases the versatility of the distributed data management system such that the distributed data management system may be deployed beyond typical enterprise environments, for example in an avionics environment (or other vehicle-based environment) or on "Internet of Things" (IoT) devices, as further described herein.

The system 100 includes a first computing device 102, a second computing device 152, and a third computing device 192. The first computing device 102, the second computing device 152, and the third computing device 192 may be communicatively coupled via a network 190. In a particular implementation, the first computing device 102, the second computing device 152, and the third computing device 192 are integrated into a vehicle. For example, the system 100 may be integrated in an aircraft, an unmanned aerial vehicle (UAV), a spacecraft, a satellite, a watercraft, or a land-based vehicle (a car, a truck, a tank, etc.). In a particular implementation, the system 100 is a distributed avionics system of an aircraft. For example, the computing devices 102, 152, and 192 may include or correspond to sensor devices, control devices, environmental devices, power devices, etc. Alternatively, the system 100 may be integrated within a building or structure, such as a refinery, a manufacturing facility, an airport, a space launch system, etc. In a particular implementation, the first computing device 102 includes or corresponds to a first line replaceable unit of an aircraft, the second computing device 152 includes or corresponds to a second line replaceable unit of the aircraft, and the third computing device 192 includes or corresponds to a third line replaceable unit of the aircraft. In another particular implementation, the first computing device 102, the second computing device 152, and the third computing device 192 are IoT devices. As non-limiting example, the computing devices 102, 152, and 192 include or correspond to building and home equipment (e.g., smart home devices, internet-connected appliances, media devices, computers, robotic devices, etc.), environmental monitoring devices, infrastructure management devices, manufacturing equipment and monitoring devices, agricultural devices, energy management devices, medical and healthcare devices, vehicles, other devices capable of generating data and accessing a network, or a combination thereof.

The first computing device 102 includes a processor 103, a memory 106, and an interface 108. The interface 108 may include or correspond to a network interface, a transmitter, a receiver, a transceiver, or a combination thereof, that is configured to communicate with other devices of the system 100 via the network 190. The processor 103 is configured to execute computer-readable instructions stored at the memory 106 to perform various operations, as further described herein. In a particular example, the processor 103 is configured to execute an application 114. The application 114 may be associated with particular operations to be performed. As a non-limiting example, the application 114 is a sensor application that is configured to receive sensor data from one or more sensors (e.g., sensor that are integrated in the first computing device 102 or that are accessible by the first computing device 102, such as via the network 190) and to generate output data, such as summarized or collected data from the one or more sensors. In a particular implementation, the application 114 may be executed by each of the computing devices 102, 152, and 192, as further described herein. The processor 103 may also be configured to execute a data manager 104 to perform one or more data management operations for shared group data, as further described herein. Although described as being executed by the processor 103, in other implementations, the data manager 104 includes dedicated circuitry or hardware, such as a field-programmable gate array (FPGA) device, an application-specific integrated circuit (ASIC), a digital signal processor (DSP), a controller, etc., software (e.g., instructions executable by a processor), firmware, or a combination thereof, that perform (or cause the processor 103 to perform) the operations described herein. The memory 106 is configured to store related device identifiers 125, one or more threshold numbers 127, a workspace 105 (e.g., a shared workspace), versioning management data 117, and peer data 129.

The second computing device 152 includes a processor 153, a memory 156, and an interface 158. The interface 158 may include or correspond to a network interface, a transmitter, a receiver, a transceiver, or a combination thereof, that is configured to communicate with other devices of the system 100 via the network 190. The processor 153 is configured to execute computer-readable instructions stored at the memory 156 to perform various operations, as further described herein. For example, the processor 153 may execute one or more applications, similar to the application 114. The memory 156 is configured to store a workspace 155 (e.g., a shared workspace). The memory 156 may also store related device identifiers, one or more threshold numbers, versioning management data, and peer data, as described with reference to the first computing device 102. The processor 153 also includes or executes a data manager 154, similar to the data manager 104 of the first computing device 102. In a similar manner, the third computing device 192 includes a processor, a memory, and an interface.

Each of the computing devices 102, 152, and 192 is configured to generate local data and to perform local operations. For example, ephemeral data (e.g., "conversational" states) and node-specific data is processed and stored locally. As used herein, the members of the system 100 (e.g., the computing device 102, 152, and 192) may also be referred to as nodes. Additionally, each of the computing devices 102, 152, and 192 is configured to generate, store, and process group data that is shared by the other devices. To illustrate, each computing device is configured to maintain a corresponding shared workspace that includes one or more files of group data. To manage the workspaces, each computing device executes or includes a corresponding data manager. For example, the first computing device 102 executes (or includes) the data manager 104 to manage the workspace 105, and the second computing device 152 executes (or includes) the data manager 154 to manage the workspace 155.

In order to enable sharing of group data among multiple computing devices of the system 100, the computing devices 102, 152, and 192 are configured to replicate group data (e.g., one or more files that are to be read from and written to by multiple computing devices of the system 100) and store the replicated data in the corresponding workspace. To illustrate, the group data may include a file, the first computing device 102 stores a first copy 107 of the file in the workspace 105 in the memory 106, the second computing device 152 stores a second copy 157 of the file in the workspace 155 in the memory 156, and the third computing device 192 stores a third copy of the file in a workspace in the memory of the third computing device 192. Although storage of copies of a single file is illustrated in FIG. 1, each workspace may include copies of more than one file. In a particular implementation, each of the workspaces 105 and 155 store one or more directories, each directory including one or more files.

The computing devices 102, 152, and 192 are configured to enable access to the copied files in the workspaces to one or more applications, such as the application 114, executed at the computing devices 102, 152, and 192. Additionally, the data managers 104 and 154 are configured to manage updates to the files stored in the respective workspaces based on one or more conditions and versioning management data. For example, the data manager 104 includes a synchronizer 110 that is configured (or executed) to synchronize the copies of files (e.g., the replicated data), such as the first copy 107, stored at the workspace 105 based on the versioning management data 117. The version management data 117 includes synchronization settings associated with particular files, synchronization settings associated with particular directories, or both. The synchronization setting associated with a file (or directory) indicates a particular synchronization scheme of multiple selectable synchronization schemes used by the data manager 104 to control synchronization of the corresponding file (or directory). The particular synchronization scheme may indicate when files are synchronized, how files are updated (e.g., written to), conditions for allowing (or preventing) updating, other synchronization information, or a combination thereof.

During operation, group data is duplicated and stored at each computing device that is a member of a group of active, connected computing devices of the system 100. For example, at a first time, the first computing device 102, the second computing device 152, and the third computing device 192 are connected via the network 190 to form a group, and group data is replicated and stored locally. To illustrate, the first computing device 102 stores the first copy 107 of the file at the memory 106, the second computing device 152 stores the second copy 157 of the file at the memory 156, and the third computing device 192 stores the third copy of the file at the memory of the third computing device 192. One or more applications executed at the computing devices 102, 152, 192 may access the copies of the file under the control of the corresponding data manager. For example, the data manager 104 may control access of the application 114 to the first copy 107 at the first computing device 102, and the data manager 154 may control access to the second copy 157 at the second computing device 152. The access may be controlled based on the versioning management data 117, which includes a synchronization setting 121 associated with the first copy 107. The synchronization setting 121 indicates a synchronization scheme associated with the first copy 107. Although a single synchronization setting is illustrated in FIG. 1, the versioning management data 117 may include a plurality of synchronization settings. For example, the versioning management data 117 may include a plurality of synchronization settings associated with a plurality of files (e.g., copies of files) stored at the workspace 105.

The data manager 104 may determine whether to enable the application 114 to access the first copy 107 based on the type of access (e.g., a read operation or a write operation) and based on the synchronization setting 121 and one or more conditions at the first computing device 102. For example, because the file is copied to the local memory (e.g., the memory 106), all read operations are permitted and do not accrue network overhead, as compared to shared file systems that retrieve shared data from a server for each read operation. For write operations (or other operations that modify or update the first copy 107), the synchronizer 110 selectively enables access to the first copy 107 by the application 114 based on the synchronization setting 121 and one or more conditions at the first computing device 102.

The synchronization setting 121 indicates one of multiple synchronization schemes or modes to be applied to the first copy 107. In some implementations, the multiple synchronization modes include a quorum mode and a high availability mode. In other implementations, other modes may be used in addition to or instead of the quorum mode, the high availability mode, or both. In a quorum mode, updates to replicated files (e.g., the first copy 107) are permitted at a particular computing device if the particular computing device is connected to a group of devices that includes at least a threshold number of devices. As an illustrative example, if the system 100 includes a total of six computing devices, a quorum may exist when a majority of the devices are included in the group (e.g., when four or more devices are included in the group). In the example illustrated in FIG. 1 (e.g., if the system includes a total of three computing devices), a quorum is a group of any two computing devices or a group of all three computing devices. In the quorum mode, as long as the group includes at least a threshold number of devices, devices of the group may update replicated data locally and share the updates among members of the group. Updates may be shared with other devices of the group using "safe writes." To perform a safe write, a computing device that has an update to a file at a workspace transmits the update to each computing device of the group and waits until the other computing devices of the group receive (and acknowledge) the update before performing the update at the workspace. Additionally, computing devices of the group maintain and communicate information between computing devices to enable write operations to be performed in order (e.g., a "total ordering of write events") among computing devices of the group. Use of the safe writes reduces data divergence between computing devices of the group (in the case of an unexpected disconnection from the network 190). Although described with reference to the quorum mode, in some implementations, safe writes (and ordering of write events) are used in all synchronization modes.

In the quorum mode, if a particular computing device is isolated (e.g., not connected to any other computing devices of the system 100) or connected to a group that includes fewer than the threshold number of computing devices, updates to replicated data are prevented. Thus, divergence of replicated data at computing devices that isolated or part of a small group is prevented. To illustrate, when the particular computing device later rejoins the group, a copy of the file stored at a different computing device of the group may be requested and used to update the local copy, thereby preventing the particular computing device from storing different data than other devices of the group. Thus, the quorum mode is designed to preserve data integrity, and is therefore beneficial for files (or directories) for which data integrity is a primary criterion, such as "critical" system files or directories.

In the high availability mode, computing devices are enabled to update replicated files regardless of whether the computing devices are part of a group that includes at least the particular number of computing devices. For example, individual computing devices that are partitioned from the network 190 may continue to update copies of files that correspond to the high availability mode while disconnected from the network 190 (or while part of a group that does not include enough computing devices to qualify as a quorum). Because a particular computing device may update the locally stored copies of files multiple times before the particular computing device is able to rejoin the group, the particular computing device may store divergent data from other members of the group. In order to provide automated recovery from potentially divergent data, the computing devices of the system 100 may perform data reconciliation operations in accordance with data reconciliation settings indicated by the versioning management data 117, as further described with reference to FIG. 2.

In this manner, the computing devices of the system 100 perform synchronization (and data reconciliation) on a per-file or per-directory basis using the versioning management data 117. The following describes particular examples of operation of the system 100. The examples are illustrative and are not intended to be limiting.

In a particular example, the data manager 104 (e.g., the processor 103) receives an update 115 to the first copy 107 of the file from the application 114 while the interface 108 is unable to communicate with the second computing device 152. For example, at a second time that is subsequent to a first time (at which the first copy 107 is stored at the workspace 105), the second computing device 152 may be powered down or disconnected from the network 190, or the first computing device 102 may be disconnected from the network 190. In response to receiving the update 115 while the interface 108 is unable to communicate with the second computing device 152, the processor 103 (e.g., the data manager 104 and the synchronizer 110) accesses the versioning management data 117 to determine the synchronization setting 121 associated with the first copy 107 of the file. If the synchronization setting 121 is a first synchronization setting, the processor 103 (e.g., the data manager 104) writes the update 115 to the first copy 107 of the file in the workspace 105. If the synchronization setting 121 is a second synchronization setting, the processor 103 (e.g., the data manager 104) refrains from writing the update 115 to the first copy 107 of the file in the workspace 105.

In a particular implementation, the versioning management data 117 includes a plurality of synchronization settings associated with a plurality of individual files stored at the workspace 105. In this implementation, the synchronization setting 121 corresponds to only the first copy 107 of the file, and other synchronization settings correspond to other files. In an alternate implementation, the versioning management data 117 indicates a synchronization setting associated with a directory of files that includes the first copy 107 of the file. For example, the synchronization setting indicates a synchronization mode applied to a plurality of files including the first copy 107 of the file. In this implementation, the processor 103 (e.g., the data manager 104) writes the update 115 to the first copy 107 of the file conditioned on determining that the synchronization setting 121 indicates the first synchronization setting corresponds to the directory of files that includes the first copy 107 of the file, and the processor 103 (e.g., the data manager 104) refrains from writing the update 115 to the first copy 107 of the file conditioned on determining that the synchronization setting 121 indicates the second synchronization setting corresponds to the directory of files.

As a first example, the processor 103 writes the update 115 to the first copy 107 of the file in response to determining that the first synchronization setting corresponds to a quorum mode and detecting that the interface 108 is able to communicate with at least a threshold number of a plurality of computing devices that includes the second computing device 152 and one or more additional computing devices. To illustrate, the computing devices 102, 152, and 192 may periodically (or responsive to events) generate peer data, such as the peer data 129, indicating which computing devices are peers (e.g., part of a group) at various times. The peer data may indicate one or more of the related device identifiers 125 (e.g., the device identifiers of all known members of the system 100). For example, at a first time when the first computing device 102 is able to communicate with the second computing device 152 and the third computing device 192 (e.g., a time when the first copy 107 of the file is received and stored), the first computing device 102 generates first peer data 131 indicating the identifiers of the second computing device 152 and the third computing device 192. At a second time when the interface 108 is unable to communicate with the second computing device 152 and the update 115 is received, the first computing device 102 generates second peer data 133 that indicates identifiers of computing devices that the interface 108 is able to communicate with. For example, the second peer data 133 may indicate the identifier of the third computing device 192 (if the interface 108 is able to communicate with the third computing device 192) or may be null data (if the interface 108 is unable to communicate with any other computing device). The peer data 129 may be updated periodically or in response to detection of a change in the number of computing devices that the interface 108 is able to communicate with.

To determine whether to write the update 115 in the quorum mode, the processor 103 determines the number of peer computing devices indicated by the second peer data 133 and compares the number to a threshold number (of the one or more threshold numbers 127) that corresponds to the synchronization setting 121. If the number satisfies (e.g., is greater than or equal to) the threshold number, the processor 103 writes the update 115 to the first copy 107 of the file. To illustrate, if the threshold number is one and the second peer data 133 indicates the identifier of the third computing device 192, the processor 103 writes the update 115 to the first copy 107 of the file in the workspace 105.

As a second example, the processor 103 writes the update 115 to the first copy 107 of the file in response to determining that the first synchronization setting corresponds to a high availability mode. In the high availability mode, the update 115 is written regardless of the number of computing devices indicated by the second peer data 133. As a third example, the processor 103 refrains from writing the update 115 to the first copy 107 of the file in response to determining that the second synchronization setting corresponds to a quorum mode and detecting that the interface 108 is able to communicate with less than a threshold number of a plurality of computing devices that includes the second computing device 152 and one or more additional computing devices. To illustrate, in the quorum mode, the processor 103 refrains from writing the update 115 to the first copy 107 of the file conditioned on the second peer data 133 indicating fewer computing devices than the threshold number.

The second computing device 152 (and the third computing device 192) perform similar operations to the first computing device 102. As an illustrative example, the processor 153 (e.g., the data manager 154) is configured, in response to receiving a second update to the second copy 157 of the file (e.g., from an application executed by the processor 153) while the interface 158 is unable to communicate with the first computing device 102, to access a copy of versioning management data stored at the memory 156. In this example, the processor 153 is configured, conditioned on determining that the versioning management data indicates that a first particular synchronization setting is associated with the second copy 157 of the file, to write the second update to the second copy 157 of the file. The processor 153 is further configured, conditioned on determining that the versioning management data indicates that a second particular synchronization setting is associated with the second copy 157 of the file, to refrain from writing the second update to the second copy 157 of the file.

Thus, the system 100 of FIG. 1 provides a distributed data management system that enables synchronization and updating operations to be performed on a per-file basis or a per-directory basis. For example, a first copy of a file may be managed according to a quorum mode, and a second copy of a second file may be managed according to a high availability mode. Because system 100 is able to manage different files according to different modes, the system 100 is more flexible than conventional distributed data management systems. Accordingly, the system 100 is more suited for use in more challenging system environments, such as vehicle-based systems or the IoT, which have fewer nodes (and limited hardware at each node), unplanned power-ups and power-downs, limited battery power, and potentially unstable networks. Because different synchronization settings can be used for different files, "critical" system files can be managed in accordance with a quorum mode to protect data integrity of the system files, and service files or sensor-generated files can be managed in accordance with a high availability mode to allow data to be updated regardless of the conditions within the distributed data management system. Because of this enhanced flexibility, the system 100 is better able to handle the challenges of vehicle-based systems, such as aircraft distributed systems, or the challenges associated with the IoT than conventional distributed data management systems that apply a single synchronization policy to all files within the distributed data management system.

Figure 2:
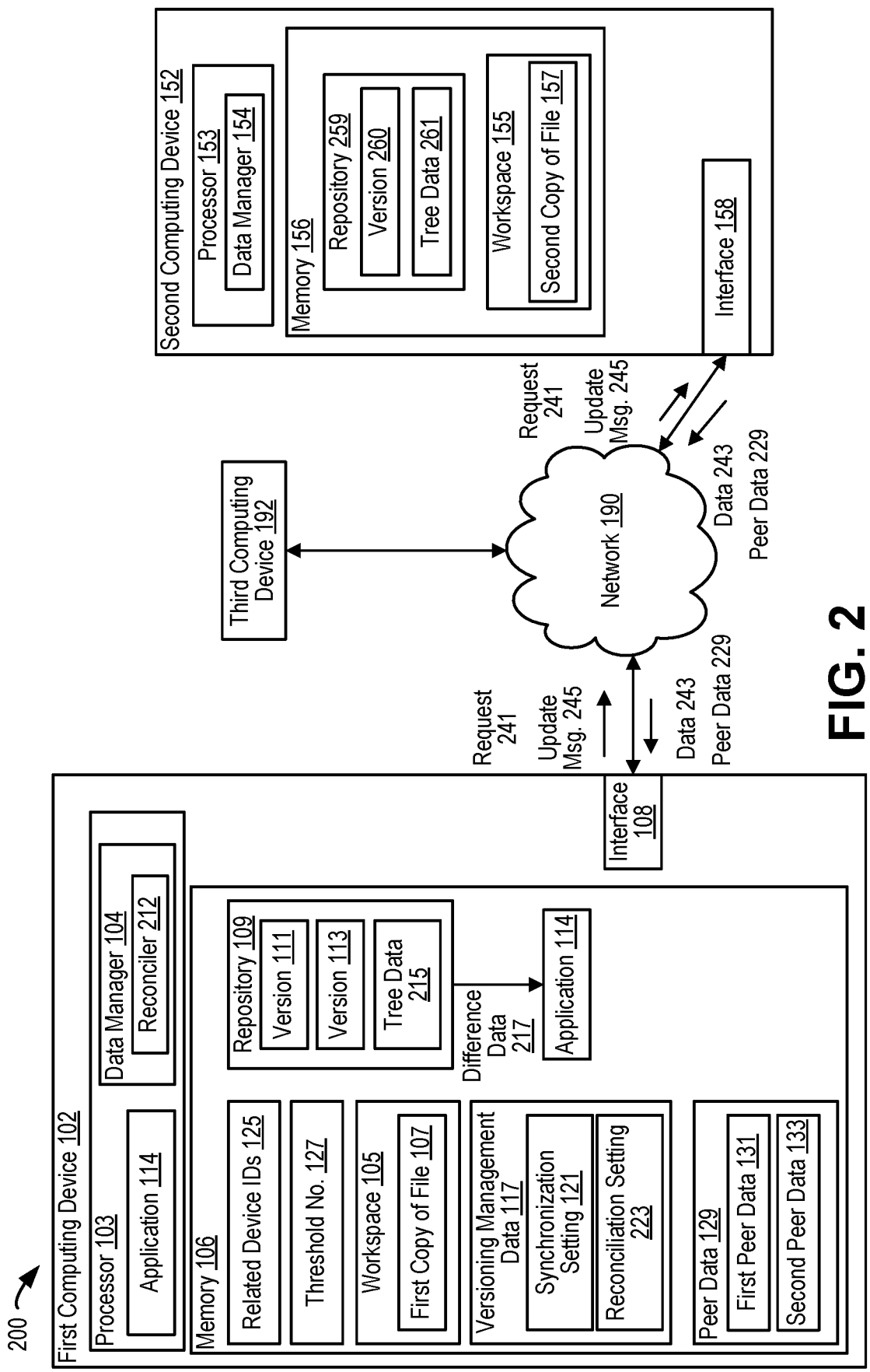
FIG. 2 is a block diagram that illustrates a particular implementation of a distributed data management system that performs data reconciliation based on a tree-based version management scheme.

FIG. 2 illustrates an example of a particular implementation of a system 200 (e.g., a distributed data management system) that performs data reconciliation based on a tree-based version management scheme. Use of the tree-based version management scheme enables devices of the system 200 to perform automated data recovery and reconciliation after synchronization. Thus, the system 200 is able to recover from partitioning events (or other events that may cause a "split-brain" condition) without a human network administrator, which enables the system 200 to be deployed in vehicle-based environments or on IoT devices.

The system 200 includes the first computing device 102, the second computing device 152, and the third computing device 192, as described with reference to FIG. 1. In addition to being configured to perform selective updating operations, as described with reference to FIG. 1, the computing devices 102, 152, and 192 are configured to perform version management of replicated data. To illustrate, the versioning management data may indicate one or more settings or rules associated with performing version control with respect to data stored at the workspaces of the computing devices 102, 152, and 192. To further illustrate, each computing device 102, 152, 192 may maintain a corresponding workspace (e.g., a directory) in memory that serves as a staging area for files (or directories) to be committed to a repository in the memory. The computing devices 102, 152, 192 may "commit" the workspace to a local repository at various times, such as in response to a detected condition. Committing a workspace, as used herein, refers to saving current state data of the files within the workspace to the local memory. In some implementations, each time the workspace is committed, state data is stored that indicates only the changes made to the workspace since the previous commitment. In other implementations, state data indicating a snapshot of the current state of the workspace is stored.

In some implementations, a globally unique identifier is associated with each individual local workspace to be synchronized as replicas of shared data. Within each workspace are individual files (e.g., copies of files) or directories (e.g., groups of copies of files) that are synchronized in accordance with individual (or directory-based) synchronization settings, as described with reference to FIG. 1. Committing the workspace (e.g., storing state data indicative of a current state of the workspace) may also be referred to as checkpointing. In a particular implementation, the workspace is committed (e.g., a checkpoint is created) after a power-on event (or after an initialization phase of a processor) and prior to synchronization with other devices of the system 200.

In a particular implementation, the computing devices 102, 152, and 192 are configured to perform "lazy synchronization". Lazy synchronization refers to synchronization only when group membership grows. Group membership may grow when peer nodes start up or when partitioned networks are merged. In some implementations, in addition to performing lazy synchronization, the computing devices 102, 152, and 192 are configured to enable application-based synchronization. For example, the first computing device 102 may be configured to synchronize the workspace 105 based on an instruction from the application 114. Application-based synchronization enables applications to synchronize workspaces prior to periods of expected activity, such as periods where intense data collection is expected to occur.

To perform synchronization, the computing devices 102, 152, and 192 are configured to commit workspaces to respective local repositories, determine whether each computing device is a "victim node" or a "survivor node", retrieve copies of replicated data from survivor nodes (if the computing device is a victim node), and perform data reconciliation operations. A victim node is a node that retrieves a copy of replicated data from a survivor node and uses the retrieved copy instead of local data such that all nodes have the same replicated data after a synchronization event. Because the victim node overwrites local data with replicated from the survivor node, the victim node is said to be "victimized." However, as further described herein, the computing devices 102, 152, and 192 are configured to maintain tree-based versioning management data that enables victim nodes to selectively preserve local data that would otherwise by lost during reconciliation.

The determination whether a particular computing device is a victim node or a survivor node is based on reconciliation settings included in the versioning management data stored at each of the computing devices 102, 152, and 192. The reconciliation settings may be stored on a per-file or per-directory basis, similar to the synchronization settings, or on a per-workspace basis. Each reconciliation setting indicates one of multiple reconciliation settings that corresponds to a respective file (or directory) stored at the workspace. In a particular implementation, the multiple reconciliation settings include a "LAST" setting, a "FIRST" setting, and a "NONE" setting. In other implementations, fewer than three or more than three reconciliation settings may be selectable. In the LAST setting, a survivor node is selected as the last node to be turned off from a group of survivor candidates (e.g., a pool of nodes that ran in the previous cycle, such as a flight cycle in avionics implementations). If the synchronization setting is quorum mode, the survivor node is the last to be turned off (or an arbitrary member) of the last set of nodes that established a quorum. In the FIRST setting, the survivor node is the first node among the survivor candidates to come online (or a node from the current largest set of nodes that are already peers). In the NONE setting, divergences between workspaces are resolved by the applications being executed by the computing devices 102, 152, and 192 (e.g., no copying and reconciliation occurs unless controlled by an application).

In order to prevent data loss during reconciliation, the computing devices 102, 152, and 192 are configured to use a tree-based version management scheme when performing workspace commitments and reconciliation operations. To illustrate, the computing devices 102, 152, and 192 are configured to generate tree data indicative of a tree of commitments. The tree-data indicates a tree of versions of the respective workspaces. For example, when the workspace is committed, the respective computing device is configured to update tree data to indicate a new node in a version tree. When a computing device is determined to be a victim node, the computing device updates the tree data to indicate a new branch prior to retrieving and storing replicated data from a survivor node. To illustrate, the computing device may indicate that the version tree branches in two directions. In one branch is the most recent version committed by the computing device (as part of a synchronization operation that results in the computing device determining that it is a victim node), and in the other branch is the version copied from a survivor node. By maintaining tree data (and branching during synchronize operations that would otherwise result in data loss), data that was updated at the computing device can be made available (e.g., provided to or retrieved by) one or more applications at the computing device, thereby enabling application-level data reconciliation operations to occur.

To illustrate, during operation, the computing devices 102, 152, and 192 may undergo one or more changes in connectivity (e.g., due to powering down or being partitioned from the network 190). For example, at an initial time, the first computing device 102, the second computing device 152, and the third computing device 192 may each be connected via the network 190 to form a group of nodes that share replicated data. For example, each of the computing devices 102, 152, 192 may store a copy of a particular file at the respective workspace. To illustrate, the first computing device 102 stores the first copy 107 of the file at the workspace 105, and the second computing device 152 stores the second copy 157 of the file at the workspace 155. The computing devices 102, 152, and 192 execute one or more applications that may attempt to update the respective copies of the file. Updates to the first copy 107 of the file are controlled based on the synchronization setting 121, as described with reference to FIG. 1.

At a second time, the first computing device 102 becomes disconnected from the other computing devices of the group (or undergoes a power-down operation, followed by a power-on operation). The processor 103 generates and stores the first peer data 131 that does not indicate any identifiers (e.g., the first peer data 131 may be null data). Updates to the first copy 107 of the file are continue to be selectively permitted based on the synchronization setting 121, as described with reference to FIG. 1. In at least some implementations, one or more updates may be made to the first copy 107 of the file (or another copy of a file within the workspace 105) after the first computing device 102 is disconnected from the other computing devices. For example, the synchronization setting 121 may indicate that the first copy 107 of the file is associated with the high availability mode.

At a second time, the first computing device 102 becomes re-connected to the network 190 and to the second computing device 152 and the third computing device 192. The processor 103 generates and stores the second peer data 133 that indicates the identifiers of the second computing device 152 and the third computing device 192. Additionally, one or more reconciliation operations are performed. For example, the data manager 104 executes (or includes) a reconciler 212 that performs data reconciliation operations. The reconciler 212 includes hardware, software, or a combination thereof, configured to perform one or more reconciliation operations, as further described herein. In a particular implementation, because the size of the peer group of the first computing device 102 has increased (from zero to two), the processor 103 commits the workspace 105 to the repository 109, in accordance with a lazy synchronization scheme indicated by the synchronization setting 121. To simplify explanation, examples are described in which the workspace contains a single file, the first copy 107 of the file. Such illustration is not intended to be limiting, and in other examples, the workspace 105 includes multiple files that are committed to the repository 109.

Committing the workspace 105 to the repository 109 includes storing the first copy 107 of the file as a first version 111. The first computing device 102 also updates tree data 215 to indicate a first node of a tree associated with the workspace 105 (including the first copy 107 of the file). For example, a head of a tree indicated by the tree data 215 is associated with the first version 111 (and any other files store in the repository 109 during committing of the workspace 105). In a similar manner, the second computing device 152 stores versions of the second copy 157 of the file in a repository 259, such as storing a first version 260, and maintains tree data 261 associated with versions of the files in the repository 259.

The processor 103 (e.g., the reconciler 212) may detect a reconciliation phase at the second time and, during the reconciliation phase, determine that the interface 108 is able to communicate with a first set of computing devices. The first set of computing devices includes the second computing device 152 and the third computing device 192, as indicated by the second peer data 133. The processor 103 (e.g., the reconciler 212) may detect the reconciliation phase in response to detecting an initialization phase of the processor 103 (e.g., after a power-up condition), detecting that communication is restored with the second computing device 152, or both. Responsive to detecting the reconciliation phase, the processor 103 (e.g., the reconciler 212) accesses the versioning management data 117 to determine a reconciliation setting 223 associated with the first copy 107 of the file. The reconciliation setting 223 indicates that the first copy 107 of the file is associated with one of multiple reconciliation settings. The multiple reconciliation settings indicate when reconciliation is to occur, how a survivor or victim node is determined, whether a quorum is used to determine a survivor node, etc.

Conditioned on determining that the reconciliation setting 223 is a first reconciliation setting, the processor 103 sends a request for updated data to the second computing device 152. For example, the reconciliation setting 223 may indicate a LAST setting, and the processor 103 may determine whether the first computing device 102 is a survivor node (or a victim node) in accordance with the LAST setting. To illustrate, the processor 103 receives peer data from each computing device of the computing devices of the set of computing devices indicated by the second peer data 133. For example, the first computing device 102 receives additional peer data 229 from the second computing device 152. The additional peer data 229 indicates a peer group of the second computing device 152 at the first time (e.g., the time when the first computing device 102 was disconnected from the network 190). In a particular example, the additional peer data 229 indicates that the third computing device 192 was a peer of the second computing device 152 at the second time.

In a particular implementation, the first computing device 102 determines whether the first computing device 102 is a victim device and, if so, determines an accessible survivor device, based on local peer data (e.g., the first peer data 131 and the second peer data 133) and the additional peer data 229. For example, if the additional peer data 229 indicates that the second computing device 152 had more peers at the second time (or was part of a quorum at the second time), the first computing device 102 determines that the second computing device 152 is a survivor node (and the first computing device 102 is a victim node). In this manner, the first computing device 102 selects the second computing device 152 (e.g., as a survivor node) based on the local peer data and the additional peer data 229.

Based on a determination that the second computing device 152 is a survivor node (and that the first computing device 102 is a victim node), the first computing device 102 sends a request 241 for a second version of the file to the second computing device 152. For example, the processor 103 (e.g., the reconciler 212) may initiate transmission via the interface 108 of the request 241 to the second computing device 152. The second computing device 152 receives the request 241 and in response sends data 243 to the first computing device via the interface 158. The data 243 indicates the second copy 157 of the file (including any updates made while the first computing device 102 was disconnected from the second computing device 152). The first computing device 102 receives the data 243 and stores the data 243 in the repository 109 as a second version 113 of the file.

Additionally, the processor 103 may update the tree data 215 to indicate a branch has occurred. For example, an entry representing the second version 113 is added as a separate branch from the most recently added entry, and the new branch is designated part of the "main trunk" (e.g., connected entries leading from a head entry to an initial entry). The other branch that contains the most recently added entry prior to the new entry is designated as a branch (e.g., as not being part of the main trunk). However, because the new entry is added to a different branch, the previously added entry may indicate changes caused by one or more updates prior to the second time. In systems that do not use tree-based versioning, such changes would be lost during the reconciliation process (e.g., overwritten with the data 243). However, systems and method of the present disclosure enable this data to be selectively preserved.

To illustrate, during the reconciliation phase, after storing the second version 113, the processor 103 uses the tree data 215 to determine difference data 217. The difference data 217 includes particular data indicating a difference between the first version 111 of the file and the second version 113 of the file. The difference data 217 is provided to one or more applications, such as the application 114 of FIG. 1, and the one or more applications perform data reconciliation. For example, the application 114 may determine whether to make one or more updates to the first copy 107 of the file based on the difference data 217 to reintroduce data that was committed after the first computing device 102 lost connection to the second computing device 152 (and would otherwise by lost by overwriting with the second version 113 of the file). For example, the application 114 may generate one or more updates during the reconciliation phase to reintroduce data that was generated while the first computing device 102 was disconnected, and due to the use of safe writes (as described with reference to FIG. 1), the one or more updates will be provided to each computing device of the group during the reconciliation phase.

In an alternate example, the second computing device 152 is disconnected from the group at the first time and rejoins the group at the second time, and the first computing device 102 remains in the group the entire time. In this example, the first computing device 102 may determine that the first computing device 102 is a survivor node. Responsive to determining that the first computing device 102 is a survivor node, the first computing device 102 sends an update message 245 to the second computing device 152 via the interface 108. The update message 245 indicates one or more updates made to the first copy 107 of the first file while the second computing device 152 was disconnected. Thus, in some implementations, survivor nodes may "push" updated copies of replicated data to victim nodes (instead of waiting for victim nodes to "pull" updated copies of replicated data).

Thus, the system 200 of FIG. 2 employs versioning (using the versioning management data 117 and storage of versions of files in the repositories 109 and 259) with respect to replicated data (e.g., shared data that is replicated and stored at the computing devices 102, 152, and 192) using a tree-based version management scheme. To illustrate, computing devices of the system 200 maintain tree data indicative of the relationship between versions of replicated data stored at a repository. For example, the first computing device 102 maintains the tree data 215 indicative of a relationship between versions (e.g., the first version 111 of the file and the second version 113 of the file) stored at the repository 109. By maintaining the tree data, the computing devices 102, 152, and 192 are able to determine data that would otherwise be lost during reconciliation and to provide an indication of that data to a corresponding application to enable application-defined recovery and re-introduction of the data. In this manner, data that would otherwise be lost during reconciliation may be reintroduced by one or more updates from the application. Thus, the system 200 enables re-synchronization of replicated data after one or more computing devices are disconnected or powered-down without data loss, which enables files associated with a high availability mode to be updated while a particular computing device is disconnected from the group without losing the updated data when the particular computing device is reconnected.

Because the system 200 performs data reconciliation without data loss (e.g., due to the tree-based versioning management scheme), the system 200 is suitable for implementations as a distributed data management system of an aircraft (or other vehicle), which may have limited or unstable power supplies, a small number of nodes, and unpredictable power-ups and power-downs, as well as having line replaceability and minimal administration overhead and data accounting, as compared to typical enterprise distributed data systems. Additionally, the tree data stored at computing devices of the system 200 indicates a record of revisions that may be used for forensic purposes, which may be common to aircraft systems in contrast to typical enterprise distributed data systems. Additionally, by offloading the data reconciliation to the application layer, the overhead associated with the system 200 is reduced as compared to typical enterprise distributed data systems. Additionally, application-driven data reconciliation reduces faults associated with a human network administrator performing data reconciliation. In some implementations, the system 200 enables lazy synchronization or periodic synchronization instead of real-time replication. Because the synchronization policies include determining survivorship based on past and current group memberships (e.g., based on the first peer data 131, the second peer data 133, and the additional peer data 229), synchronization is able to be performed without use of synchronized system clocks, which would increase the complexity of the computing devices 102, 152, and 192.

Figure 3:
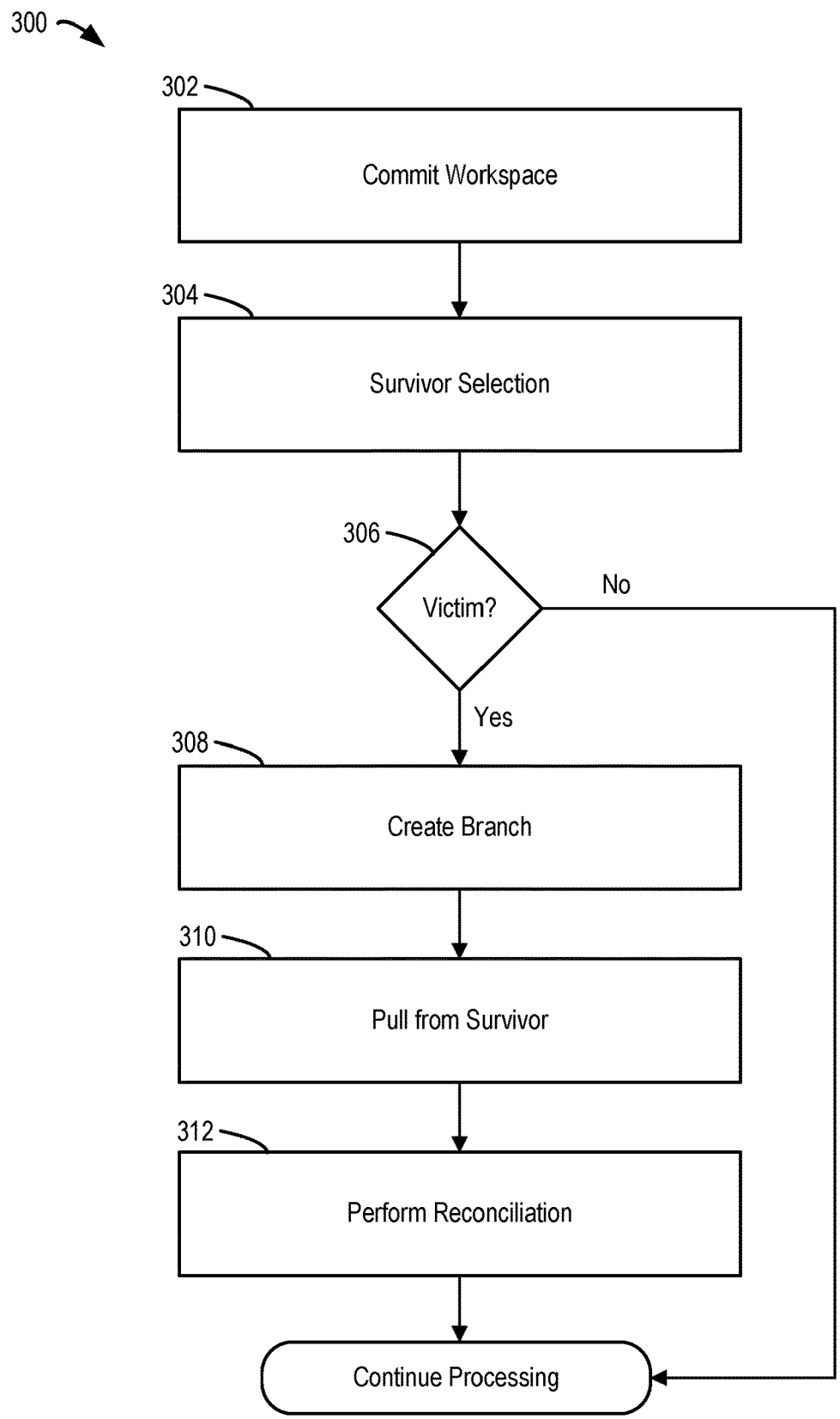
FIG. 3 is a flow chart of an example of a method of performing data synchronization and reconciliation.

FIG. 3 illustrates a method 300 of performing data synchronization and reconciliation. In some implementations, the method 300 is performed by the first computing device 102, the second computing device 152, or the third computing device 192 of FIGS. 1 and 2, as non-limiting examples. The method 300 corresponds to a method of performing "lazy synchronization", as described with reference to FIG. 2. In a particular implementation, the method 300 is initiated in response to detecting a particular condition, such as a power-on operation, an initialization operation, or an increase in a number of peers in a peer group at a computing device. In other implementations, the method 300 may be initiated by an application.

The method 300 includes, at a particular computing device, committing a workspace, at 302. Committing the workspace includes storing state information indicative of a state of the workspace in a repository. For example, the first computing device 102 may store the first copy 107 of the file at the repository 109 as the first version 111 of the file, as described with reference to FIG. 2.

The method 300 includes survivor selection, at 304. Survivor selection is based on a reconciliation setting stored in versioning management data. For example, the reconciliation setting 223 included in the versioning management data 117 may indicate a method of determining a survivor node. In a particular implementation, reconciliation settings are stored on a per-file basis. In another particular implementation, reconciliation settings are stored on a per-directory basis. In another particular implementation, reconciliation settings are stored on a per-workspace basis.

The method 300 includes determining whether the particular computing device is a victim node, at 306. For example, the particular computing device may determine whether it is a victim by accessing the reconciliation setting stored in the versioning management data. In a particular implementation, the reconciliation setting indicates that survivor nodes are determined based on a LAST setting, a FIRST setting, or a NONE setting, as described with reference to FIG. 2. In a particular implementation, all computing devices that are not the survivor node are considered to be victim nodes. If the particular computing device is not a victim node, the method 300 continues to process updates to files in the workspace in accordance with a synchronization setting, until detection of a subsequent condition that triggers the workspace to be committed.

If the particular computing device is determined to be a victim node, the method 300 continues to 308, and a branch is created. For example, the first computing device 102 may update the tree data 215 to indicate that a branch has occurred with respect to the previously committed version of the workspace (e.g., the first version 111 of the file).

The method 300 includes pulling data from a survivor node, at 310. For example, the first computing device 102 may send the request 241 to the second computing device 152 (responsive to determining that the second computing device 152 is a survivor node), and the first computing device 102 receives the data 243 from the second computing device 152 responsive to sending the request 241. The data 243 indicates the second copy 157 of the file. The first computing device 102 stores the data 243 as the new version of the first copy 107 in the workspace 105 and in the repository 109 as the second version 113 of the file.

The method 300 further includes performing reconciliation, at 312. For example, the processor 103 (e.g., the reconciler 212) determines the difference data 217 indicating a difference between the second version 113 and the first version 111. The difference data 217 is provided to the application 114, and the application 114 determines whether to add data indicated by the difference data 217 in one or more subsequent updates to the first copy 107 of the file during the reconciliation phase. In this manner, application-level reconciliation is performed, and data is not lost during reconciliation due to the tree-based versioning management scheme that includes using the tree data 215.

Thus, the method 300 of FIG. 3 enables devices of a distributed data management system to perform synchronization and data reconciliation operations without losing data. Performing data reconciliation without data loss may be important in particular environments, such as vehicle-based environments or IoT environments, where each computing devices continue to receive or generate data regardless of whether the computing devices are connected with other computing devices.

FIGS. 4-8 illustrate examples of operations of a distributed data management system. In FIGS. 4-8, the operations are illustrated by activity diagrams that include a string of states, data, and events in the following manner: workspace state→(delta)→event→(delta)→ synched workspace state. The workspace state carries information on the workspace and is notated as follows:

nodes:(PrevPeers)→(CurrPeers), HEAD [DELTA]

where nodes is a list of nodes that have the same workspace state, PrevPeers are previous workspace peer nodes, CurrPeers are current workspace peer nodes, HEAD is a designator for the last committed version of the workspace, and DELTA is a notational designator for accumulated changes made to the workspace since HEAD.

A first example of a workspace notation is AB:(ABC)→(AB), c1. In this example, nodes A and B have the same workspace state, the previous peers of nodes A and B were nodes A, B, and C, and the current peers of nodes A and B are themselves (e.g., node B is a peer of node A, and node A is a peer of node B). The HEAD revision is designated c1, and no changes have been made to the workspace since c1.

A second example of a workspace notation is B:(ABC)→(B), c1, d1. In this example, node B is currently by itself (e.g., disconnected from other nodes), and nodes A, B, and C were previously peers. The HEAD revision is designated c1, and node B has made update d1 to the shared workspace subsequent to the commit associated with c1.

A third example of a workspace notation is B:(ABC)→(AB), c1, d1'. In this example, node B is powered down (possibly before applying update d1), nodes A, B, and C were previously peers, and after node B is powered-on, nodes A and B are peers. The HEAD revision is designated c1, and node B has made update d1' to the shared workspace subsequent to the commit associated with c1. Because node B may have lost power before making all of update d1, the update is designated d1' (indicative of at least some, but potentially not all, of update d1).

Figure 4:
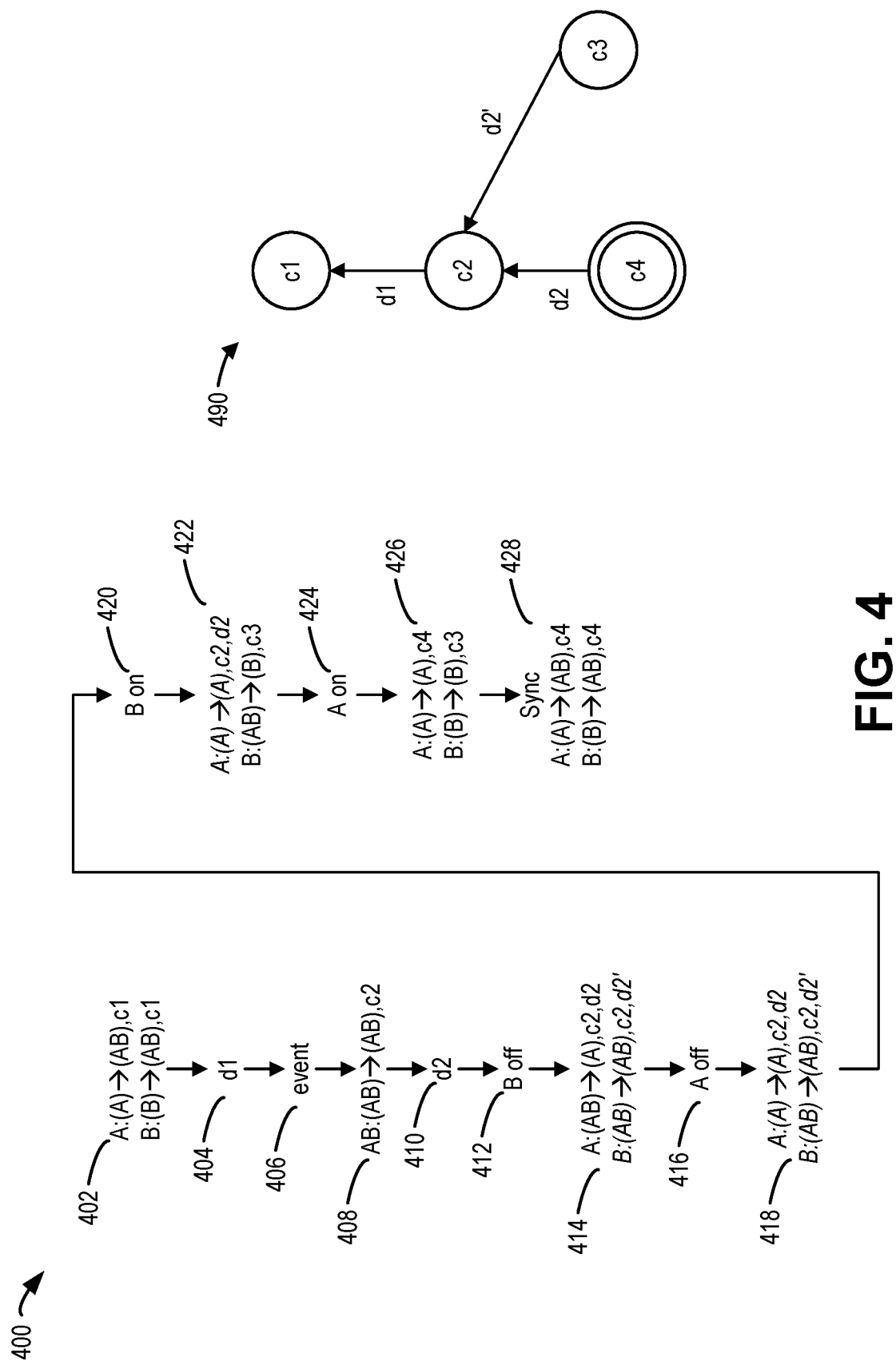
FIG. 4 illustrates a first example of operations of devices of a distributed data management system in accordance with aspects of the present disclosure.

Referring to FIG. 4, a first example of operations of devices of a distributed data management system is shown and generally designated 400. FIG. 4 illustrates operations of a first node ("node A") and a second node ("node B"). In a particular implementation, node A and node B include or correspond to the first computing device 102 and the second computing device 152 of FIGS. 1 and 2, respectively.

At 402, node A and node B join a peer set and store identical copies of replicated data, which are committed as c1. Thus, at this point in time, the files in the workspace at node A and the files in the workspace at node B are the same, and are indicated by the HEAD c1. Each of the nodes A and B store tree data indicating an entry for version c1, and that entry is designated the HEAD.

At 404, update d1 to the shared workspace occurs. Due to the use of safe writes, as described with reference to FIG. 1, when an application at one node updates the shared workspace, the update is provided to each other node of the peer set and, as long as each node of the peer set remains powered-on and connected, the update is made at each node of the peer set. For example, an application executed at node A or node B may generate the update d1, and both node A and node B perform the update d1 at a respective workspace.

At 406, an event occurs that triggers synchronization. The event may be a change in membership of the peer set, power cycling (e.g., powering down and powering up) at one of the nodes of the peer group, or a periodically occurring synchronization time, as non-limiting examples. In the first example 400 illustrated in FIG. 4, the event occurs after completion of the update d1 at the nodes A and B.

At 408, nodes A and B commit respective workspaces to respective repositories. The commit is represented by c2=c1+d1. Because node A and node B remained peers between committing the workspaces at 402 and at 408, the committed workspaces of node A and node B remain the same. Additionally, node A and node B add an entry corresponding to c2 to the respective tree data, and designate the entry associated with c2 as the HEAD.

At 410, update d2 to the shared workspace occurs. Due to the use of safe writes, both node A and node B begin to perform the update d2 at the respective workspace. At 412, node B is powered off. Node B may be powered off before completion of the update d2 at node B's workspace. Accordingly, at 414, node A's peer set changes from A and B to A alone. Node A may update peer data to indicate that node B is no longer in the peer set. Because no commitment has occurred since 408, the HEAD at node A still indicates c2, and update d2 is pending. Additionally, prior to being powered off, update d2' was pending at node B. Node B's update is designated d2' because it is unknown if all of update d2 was performed (or just a portion thereof) before node B was powered down.

At 416, node A is powered off. Prior to being powered off, there was no commitment and no additional update. Accordingly, at 418, the state of the workspaces at node A and node B is the same as the state of the workspaces at 414. At 420, node B is powered on. In accordance with a synchronization setting stored at node B, node B may be configured to commit the workspace in response to detecting a power on or an initialization operation. Accordingly, at 422, node B commits the workspace to the repository. The commit is represented by c3=c2+d2'. Node B adds an entry corresponding to c3 to the tree data and designates the entry as the HEAD. Additionally, node B detects that it is no longer peered with node A and changes the peer set to indicate that node B has no peers. For example, node B may update peer data stored at node B to indicate that no other nodes are in the peer set.

At 424, node A is powered on. Accordingly, at 426, node A commits its workspace to its repository. The commit is represented by c4=c2+d2. Node A adds an entry corresponding to c4 to the tree data and designates the entry as the HEAD.

At 428, node A detects that it is connected with node B and updates its peer set to include node B. Node B similarly detects that it has reconnected with node A and updates its peer set to include node A. Additionally, nodes A and B perform synchronization. For example, synchronization settings at node A and node B may indicate that synchronization is to be performed in response to detecting power up (or initialization) and in response to detecting an increase to the respective peer set. In a particular implementation, such synchronization settings indicate a lazy synchronization scheme. As part of synchronization, node A and node B determine a survivor node. Rules for determining a survivor node may be indicated by a reconciliation setting stored at each node. The reconciliation settings may be stored on a per-file, per-director, or per-workspace basis.

In the first example 400 of FIG. 4, a survivor node is determined to be the last node to be active in a peer set. In other implementations, the survivor node may be determined using other rules. Because node A remained in the peer set after node B was powered off, node A is determined to be the survivor. The survivor node may be determined based on comparing peer data, as described with reference to FIG. 2. Accordingly, node B sends a request to node A for the shared workspace, and node A provides the workspace corresponding to c4 to node B.

Node B overwrites the data stored in its workspace with the data from node A and commits the workspace to the repository. The commit is represented by c4. Node B also creates a branch in the tree data in response to determining that Node B is not the survivor. To illustrate, node B adds an entry for c4 to the tree-data as a new branch off of the entry for c2, such that the entry for c4 and the entry for c3 are on different branches. Node B designates the entry for c4 to be the HEAD. However, because a branch for the c3 entry exists, node B can compare c4 to c3 to determine difference data to be provided to an application for performance of application-level data reconciliation. In the particular example illustrated in FIG. 4, the difference between c4 and c3 is the portion of update d2 that was not finished prior to node B being powered down. Thus, data reconciliation does not add any additional updates in this particular example.

FIG. 4 also illustrates a directed acyclic graph 490 indicative of versions of a workspace (e.g., the workspaces 105 and 155 of FIGS. 1 and 2) and relationships between the versions. In the particular example illustrated in FIG. 4, the directed acyclic graph 490 indicates tree data (e.g., the tree data 261) generated and stored at node B. For example, at 402, node B adds an entry corresponding to c1, and at 408, node B adds an entry corresponding to c2. The difference between c2 and c1 is d1, as shown by the arrow from c2 to c1. At 422, node B adds the entry for c3. The difference between c3 and c2 is d2', as shown by the arrow from c3 to c2. At 428, node B adds the entry corresponding to c4 to a new branch. The difference between c4 and c2 is d2, as shown by the arrow from c4 to c2. Additionally, the entry corresponding to c4 is set as the HEAD at 428, as indicated by the circle around c4. Additional entries may be made by adding entries connected to c4. In a particular implementation, entries c1, c2, and c4 may be referred to as a "main trunk" of the tree indicated by the directed acyclic graph 490, and c3 may be referred to as a branch entry. As further described herein, branch entries may be compared to main trunk entries to determine difference data that is provided to applications to prevent data loss during reconciliation. Node A stores similar tree data including entries corresponding to c1, c2, and c4, but not c3.

Figure 5:
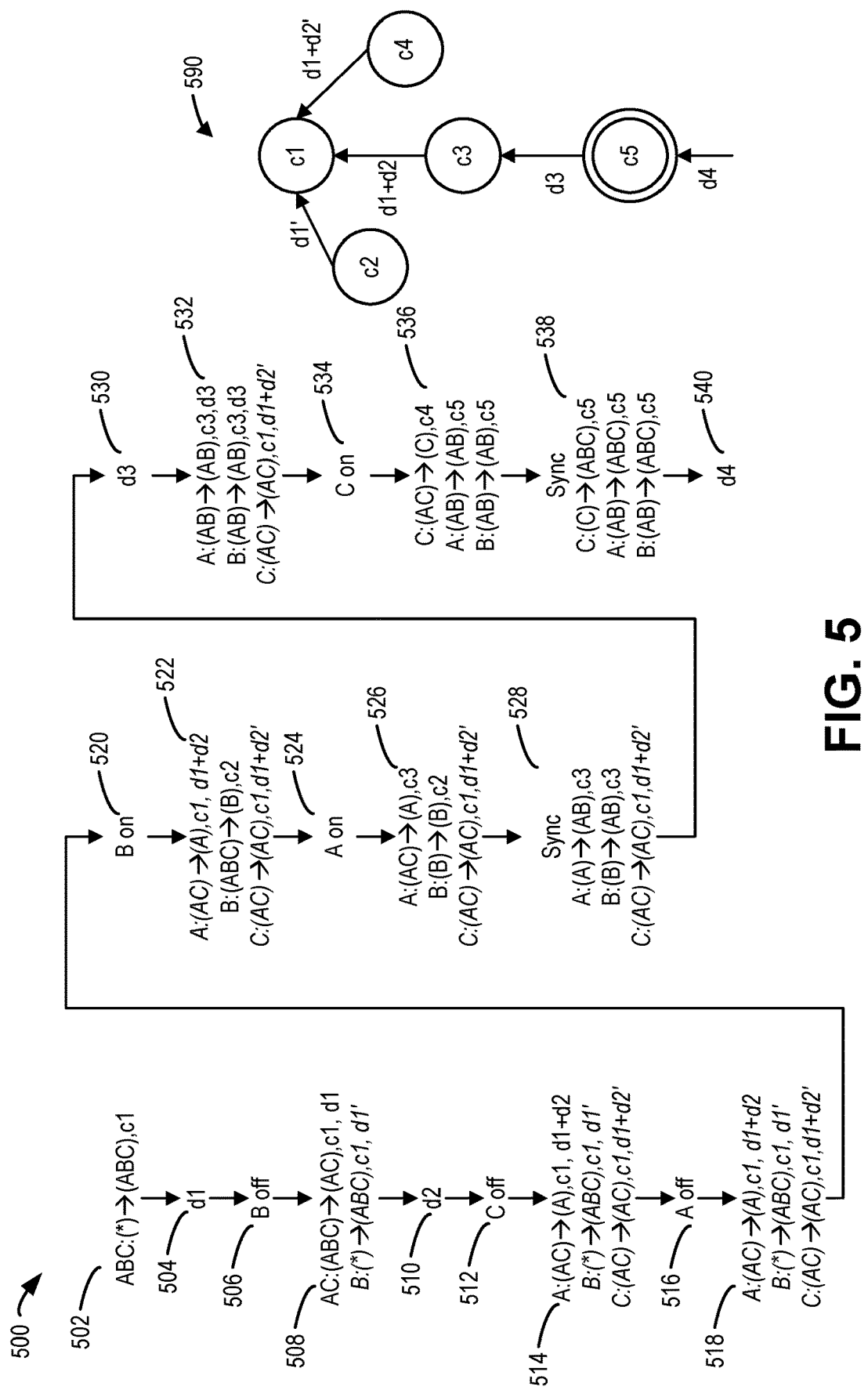
FIG. 5 illustrates a second example of operations of devices of a distributed data management system in accordance with aspects of the present disclosure.

Referring to FIG. 5, a second example of operations of devices of a distributed data management system is shown and generally designated 500. FIG. 5 illustrates operations of a first node ("node A"), a second node ("node B"), and a third node ("node C"). In a particular implementation, node A, node B, and node C include or correspond to the first computing device 102, the second computing device 152, and the third computing device 192 of FIGS. 1 and 2, respectively. In the second example 500, the files are synchronized in accordance with a quorum mode that prevents updates from being applied to a workspace if a peer set drops below N/2 nodes (2 nodes when N=3). Additionally, the survivor node is determined in FIG. 5 as the LAST node remaining in a previous quorum.

At 502, node A, node B, and node C join a peer set and store identical copies of replicated data, which are committed as c1. Thus, at this point in time, the files in the workspace at node A, the files in the workspace at node B, and the files in the workspace at node C are the same, and are indicated by the HEAD c1. Each of the nodes A, B, and C store tree data indicating an entry for version c1, and that entry is designated the HEAD. The previous peer sets of nodes A, B, and C are indicated by (*).

At 504, update d1 to the shared workspace occurs. Due to the use of safe writes, nodes A, B, and C begin performing the update d1 at respective workspaces. At 506, node B is powered off. Node B may be powered off before completion of the update d1 at node B's workspace. Accordingly, at 508, the peer sets of node A and C change to include only nodes A and C (and not node B). Nodes A and C may update peer data to indicate that node B is no longer in the peer set. Because no commitment has occurred since 502, the HEAD at nodes A and C still indicates c1, and update d1 is pending. Additionally, prior to being powered off, update d1' was pending at node B. Node B's update is designated d1' because it is unknown if all of update d1 was performed (or just a portion thereof) before node B was powered down.

At 510, update d2 to the shared workspace occurs. Because node A and node C are each included in a peer set of size 2 (e.g., A and C), a quorum remains and updates are still permitted. Accordingly, nodes A and C begin performing the update d2. At 512, node C is powered off. Accordingly, at 514, node A detects that node C is no longer connected and updates its peer set to include only itself.

Additionally, updates d1 and d2 are pending at node A. Node C may be powered off before completion of the update d2, and thus the updates pending at node C are designated as d1 and d2'. At this point, the quorum is lost, and no nodes are able to perform updates to the respective workspaces.

At 516, node A is powered off. Prior to being powered off, there was no commitment and no additional update. Accordingly, at 518, node A's peer set included node A and updates d1 and d2 are pending, node B's peer set includes nodes, A, B and C and update d1' is pending, and node C's peer set includes nodes A and C and updates d1 and d2' are pending.

At 520, node B is powered on. At 522, node B commits its workspace to the repository in response to detecting a power-up operation (or an initialization operation). The commit is represented by $c2=c1+d1'$. Node B adds an entry corresponding to c2 to the tree data and designates the entry as the HEAD. Additionally, node B detects that it is no longer peered with nodes A and C and changes the peer set to indicate that node B has no peers. For example, node B may update peer data stored at node B to indicate that no other nodes are in the peer set. Although node B is powered on, node B is not part of a quorum, and thus any updates received from applications executing at node B are prevented from modifying the workspace.

At 524, node A is powered on. Accordingly, at 526, node A commits its workspace to the repository in response to detecting a power-up condition (or an initialization operation). The commit is represented by $c3=c1+d1+d2$. Node A adds an entry corresponding to c3 to the tree data and designates the entry as the HEAD.

At 528, node A detects that it is connected with node B and updates its peer set to include node B. Node B similarly detects that it has reconnected with node A and updates its peer set to include node A. Additionally, nodes A and B perform synchronization. As part of synchronization, node A and node B determine a survivor node in accordance with a LAST setting (a setting indicating that the last member of a quorum is selected as the survivor node). Nodes A and B share peer data and determine that node A was the last member of a quorum, thus node A is selected as the survivor node. Node B sends a request to node A for the shared workspace, and node A provides the workspace corresponding to c3 to node B. Node B overwrites the data stored in its workspace with the data from node A and commits the workspace to the repository. The commit is represented by c3. Node B also creates a branch in the tree data in response to determining that Node B is not the survivor. To illustrate, node B adds an entry for c3 to the tree-data as a new branch off of the entry for c1, such that the entry for c3 and the entry for c2 are on different branches. Node B designates the entry for c3 to be the HEAD. Because FIG. 5 illustrates operations in a quorum mode, the entry associated with c2 is not used to perform data reconciliation (because the entry was generated while node B was not part of a quorum). At this point, a quorum exists and nodes A and B may allow updates to modify the workspaces.

At 530, update d3 occurs. Because nodes A and B are part of a quorum (e.g., their peer sets include at least two nodes, A and B), nodes A and B begin performing the update d3. Accordingly, at 532, the peer sets of node A and B include two nodes (nodes A and B), and update d3 is pending. At 534, node C is powered on. Accordingly, at 536, node C commits its workspace to the repository in response to detecting a power-up condition (or an initialization operation). The commit is represented by $c4=c1+d1+d2'$. Node C adds an entry corresponding to c4 to the tree data and designates the entry as the HEAD. Additionally, nodes A and B commit their workspaces to their repositories. These commits are represented by $c5=c3+d3$. Nodes A and B add entries corresponding to c5 to their tree data and designate the entries as the HEAD.

At 528, node C detects connection with nodes A and B, and nodes A and B detect connection with node C. Node C updates its peer set to include nodes A and B, and nodes A and B update their peer set to include node C. Additionally, nodes A, B, and C perform synchronization. As part of synchronization, nodes A, B, and C determine a survivor node in accordance with a LAST setting (a setting indicating that the last member of a quorum is selected as the survivor node). Nodes A, B, and C share peer data and determine that node A was the last member of a quorum, thus node A is selected as the survivor node. Node C sends a request to node A for the shared workspace, and node A provides the workspace corresponding to c5 to node C. Node C overwrites the data stored in its workspace with the data from node A and commits the workspace to the repository. The commit is represented by c5. Node C also creates a branch in the tree data in response to determining that Node C is not the survivor. To illustrate, node C adds an entry for c5 to the tree-data as a new branch off of the entry for c1, such that the entry for c5 and the entry for c4 are on different branches. Node C designates the entry for c5 to be the HEAD. Because FIG. 5 illustrates operations in a quorum mode, the entry associated with c4 may be used to perform data reconciliation (because the entry was generated while node C was part of a quorum), however, c4 does not include any additional data that is not included in c5. At this point, nodes A, B, and C are part of a quorum, and each node may allow updates to modify the respective workspace. For example, at 540, update d4 occurs and is applied to the workspaces of the nodes A, B, and C.

FIG. 5 also illustrates a combined directed acyclic graph 590 indicative of versions of a workspace and relationships between the versions. The combined directed acyclic graph 590 is based on tree data stored at the three nodes A, B, and C, although each node may only store data indicative of a portion of the combined acyclic graph 590 (e.g., each node may store tree data indicative of branches created at the respective node, and not branches created at the other nodes). To illustrate, the tree data stored at node A includes the entries corresponding to c1 (added at 502), c3 (added at 526), and c5 (added at 536). The tree data stored at node B includes the entries corresponding to c1 (added at 502), c2 (added at 522), c3 (added at 538), and c5 (added at 536). The tree data stored at node C includes the entries corresponding to c1 (added at 502), c4 (added at 536), and c5 (added at 538, with a connection directly to c1 and a difference of d1+d2+d3).

Figure 6:
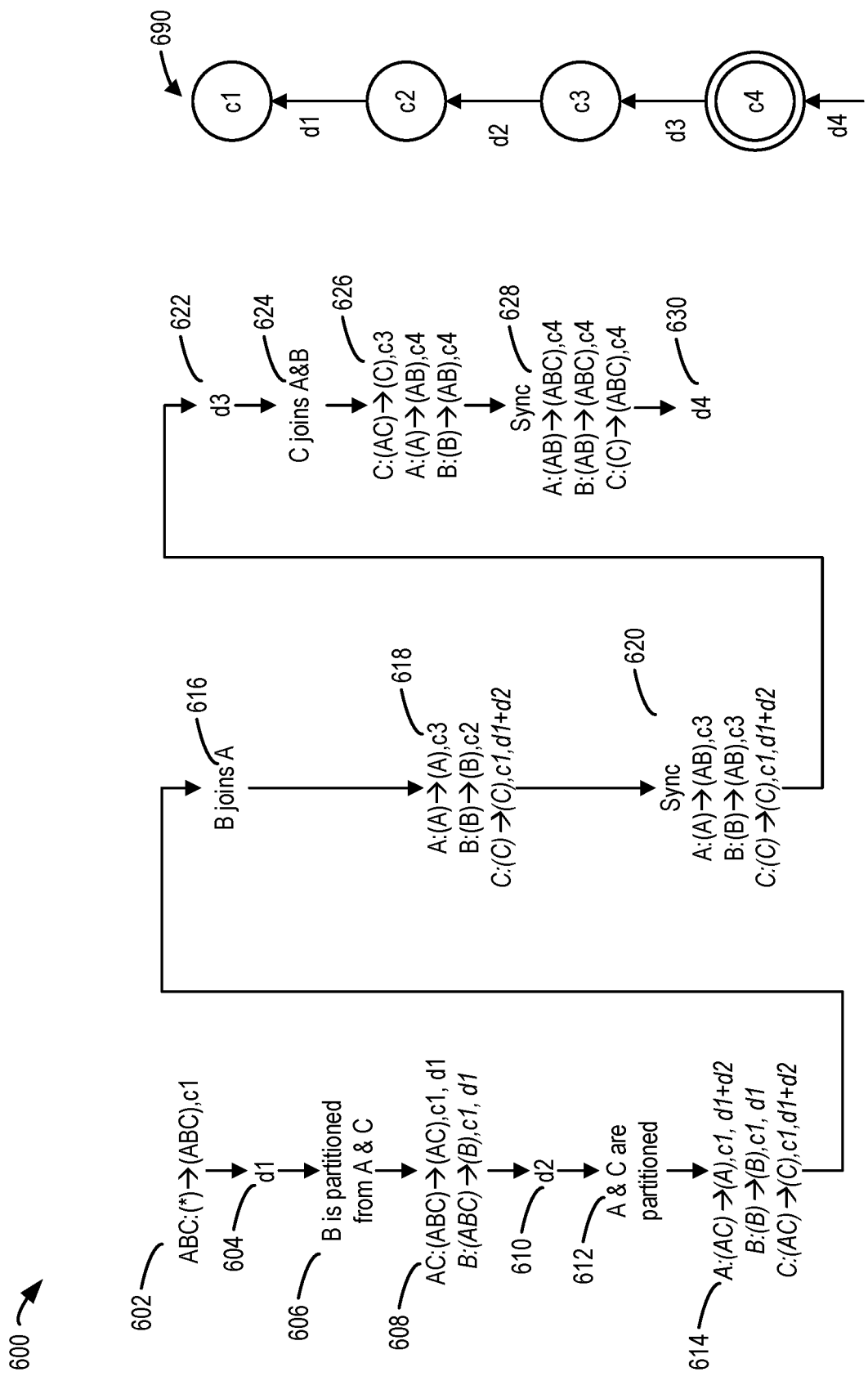
FIG. 6 illustrates a third example of operations of devices of a distributed data management system in accordance with aspects of the present disclosure.

Referring to FIG. 6, a third example of operations of devices of a distributed data management system is shown and generally designated 600. FIG. 6 illustrates operations of a first node ("node A"), a second node ("node B"), and a third node ("node C"). In a particular implementation, node A, node B, and node C include or correspond to the first computing device 102, the second computing device 152, and the third computing device 192 of FIGS. 1 and 2, respectively. In the third example 600, the files are synchronized in accordance with a quorum mode that prevents updates from being applied to a workspace if a peer set drops below N/2 nodes (2 nodes when N=3). Additionally, the survivor node is determined in FIG. 6 as the LAST node remaining in a previous quorum.

At 602, node A, node B, and node C join a peer set and store identical copies of replicated data, which are committed as c1. Thus, at this point in time, the files in the workspace at node A, the files in the workspace at node B, and the files in the workspace at node C are the same, and are indicated by the HEAD c1. Each of the nodes A, B, and C store tree data indicating an entry for version c1, and that entry is designated the HEAD. The previous peer sets of nodes A, B, and C are indicated by (*).

At 604, update d1 to the shared workspace occurs. Due to the use of safe writes, nodes A, B, and C begin performing the update d1 at the respective workspaces. At 606, node B is partitioned from nodes A and C (but remains powered). Node B is partitioned after completion of the update d1 at node B's workspace. Accordingly, at 608, the peer sets of nodes A and C change to include only nodes A and C (and not node B), and node B's peer set is changed to include only node B. Nodes A and C may update peer data to indicate that node B is no longer in the peer set, and node B may update peer data to indicate that nodes A and C are no longer in the peer set. Because no commitment has occurred since 602, the HEAD at nodes A, B, and C still indicates c1, and update d1 is pending.

At 610, update d2 to the shared workspace occurs. Because node A and node C are each included in a peer set of size 2, a quorum remains and updates are still permitted. Accordingly, nodes A and C begin performing the update d2. At 612, nodes A and C are partitioned. Accordingly, at 614, node A detects that node C is no longer connected and updates its peer set to include only itself. Additionally, updates d1 and d2 are pending at node A. Node C detects that node A is no longer connected and updates its peer set to include only itself. Additionally, updates d1 and d2 are pending at node C. At this point, the quorum is lost, and no nodes are able to perform updates to the respective workspaces.

At 616, node B joins (e.g., reconnects) with node A. Accordingly, at 618, nodes A and B determine an increase to the peer sets and commit their respective workspaces. Node A's commit is represented by c3=c1+d1+d2, and node B's commit is represented by c2=c1+d1. Node A adds an entry corresponding to c3 to the tree data and designates the entry as the HEAD, and node B adds an entry corresponding to c2 to the tree data and designates the entry as the HEAD.

At 620, node A detects that it is connected with node B and updates its peer set to include node B. Node B similarly detects that it has reconnected with node A and updates its peer set to include node A. Additionally, nodes A and B perform synchronization. As part of synchronization, node A and node B determine a survivor node in accordance with a LAST setting (a setting indicating that the last member of a quorum is selected as the survivor node). Nodes A and B share peer data and determine that node A was the last member of a quorum, thus node A is selected as the survivor node. Node B sends a request to node A for the shared workspace, and node A provides the workspace corresponding to c3 to node B. Node B overwrites the data stored in its workspace with the data from node A and commits the workspace to the repository. The commit is represented by c3. Because c3 includes all the changes associated with c2, node B adds an entry for c3 to the tree-data as a new entry connected to c2, such that the entries for c2 and c3 are in the main trunk. Node B designates the entry for c3 to be the HEAD.

At 622, update d3 occurs. Because nodes A and B are part of a quorum (e.g., their peer sets include at least two nodes, A and B), nodes A and B begin performing the update d3. At 624, node C joins (e.g., reconnects) with nodes A and B. Accordingly, at 626, node C commits its workspace to the repository in response to detecting a power-on operation (or initialization operation). Node C's commit is represented by c3. Node C adds an entry corresponding to c3 to the tree data and designates the entry as the HEAD. Additionally, nodes A and B commit their workspaces to their repositories. These commits are represented by c4=c3+d3. Nodes A and B add entries corresponding to c4 to their tree data and designate the entries as the HEAD.

At 628, node C detects connection with nodes A and B, and nodes A and B detect connection with node C. Node C updates its peer set to include nodes A and B, and nodes A and B update their peer set to include node C. Additionally, nodes A, B, and C perform synchronization. As part of synchronization, nodes A, B, and C determine a survivor node in accordance with a LAST setting (a setting indicating that the last member of a quorum is selected as the survivor node). Nodes A, B, and C share peer data and determine that node A was the last member of a quorum, thus node A is selected as the survivor node. Node C sends a request to node A for the shared workspace, and node A provides the workspace corresponding to c4 to node C. Node C overwrites the data stored in its workspace with the data from node A and commits the workspace to the repository. Because c4 includes all the changes associated with c3, node C adds an entry for c4 to the tree-data as a new entry connected to c3, such that the entries for c3 and c4 are in the main trunk. Node C designates the entry for c4 to be the HEAD. Because there are no branches in the tree data, data reconciliation is not performed. At this point, nodes A, B, and C are part of a quorum, and each node may allow updates to modify the respective workspace. For example, at 630, update d4 occurs and is applied to the workspaces of the nodes A, B, and C.

FIG. 6 also illustrates a combined directed acyclic graph 690 indicative of versions of a workspace and relationships between the versions. The combined directed acyclic graph 690 is based on tree data stored at the three nodes A, B, and C, although each node may only store data indicative of a portion of the combined acyclic graph 690 (e.g., each node may store tree data indicative of branches created at the respective node, and not branches created at the other nodes). To illustrate, the tree data stored at node A includes the entries corresponding to c1 (added at 602), c3 (added at 618), and c4 (added at 626). The tree data stored at node B includes the entries corresponding to c1 (added at 602), c2 (added at 618), c3 (added at 620), and c4 (added at 626). The tree data stored at node C includes the entries corresponding to c1 (added at 602), c3 (added at 626), and c4 (added at 628).

Figure 7:
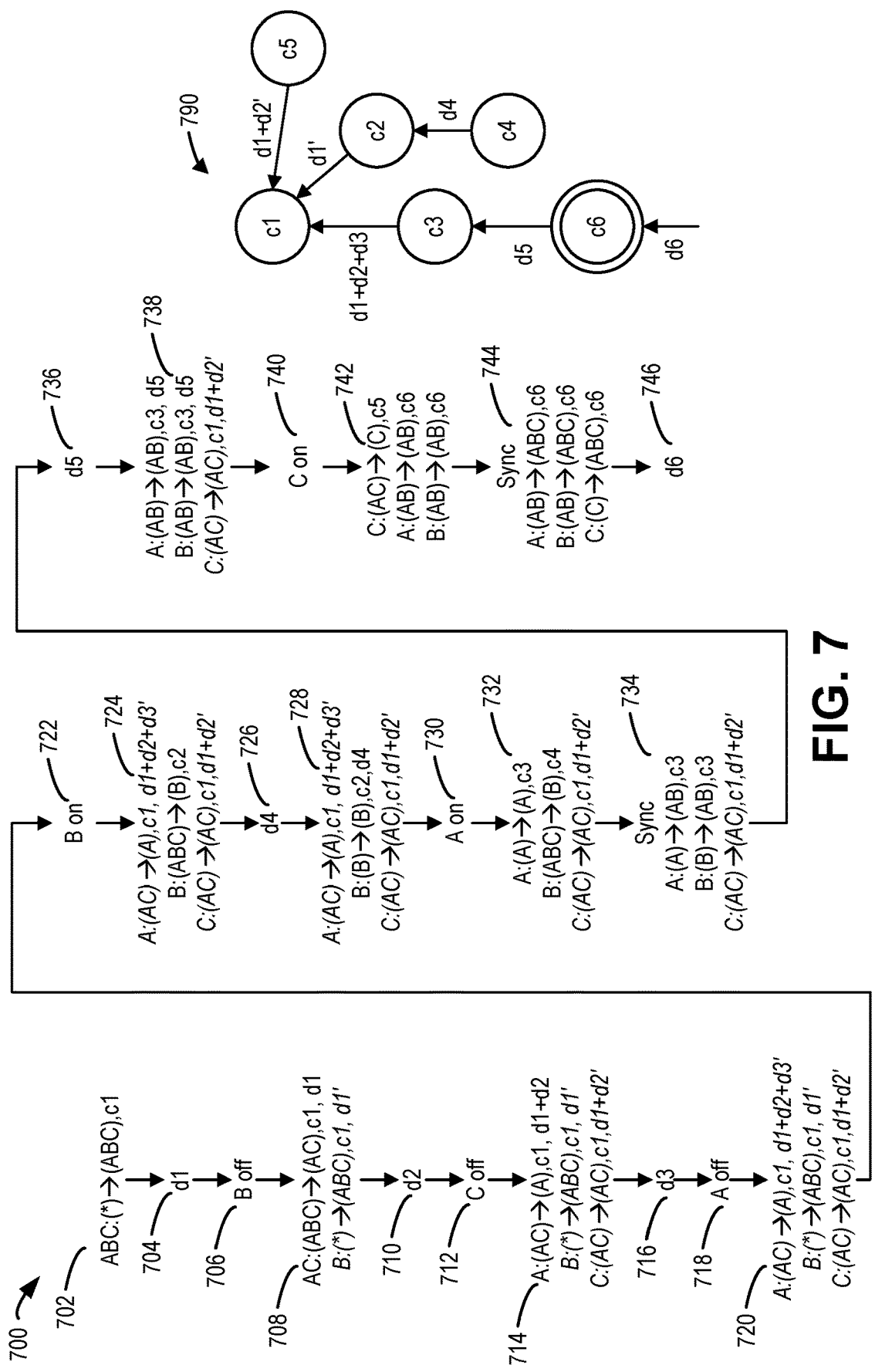
FIG. 7 illustrates a fourth example of operations of devices of a distributed data management system in accordance with aspects of the present disclosure.

Referring to FIG. 7, a fourth example of operations of devices of a distributed data management system is shown and generally designated 700. FIG. 7 illustrates operations of a first node ("node A"), a second node ("node B"), and a third node ("node C"). In a particular implementation, node A, node B, and node C include or correspond to the first computing device 102, the second computing device 152, and the third computing device 192 of FIGS. 1 and 2, respectively. In the fourth example 700, the files are synchronized in accordance with a high availability mode that enables updates to be applied to a workspace regardless of a size of a node's peer set. Additionally, the survivor node is determined in FIG. 7 as the LAST node remaining in a previous quorum.

At 702, node A, node B, and node C join a peer set and store identical copies of replicated data, which are committed as c1. Thus, at this point in time, the files in the workspace at node A, the files in the workspace at node B, and the files in the workspace at node C are the same, and are indicated by the HEAD c1. Each of the nodes A, B, and C store tree data indicating an entry for version c1, and that entry is designated the HEAD. The previous peer sets of nodes A, B, and C are indicated by (*).

At 704, update d1 to the shared workspace occurs. Due to the use of safe writes, nodes A, B, and C begin performing the update d1 at respective workspaces. At 706, node B is powered off. Node B may be powered off before completion of the update d1 at node B's workspace. Accordingly, at 708, the peer sets of node A and C change to include only nodes A and C (and not node B). Nodes A and C may update peer data to indicate that node B is no longer in the peer set. Because no commitment has occurred since 702, the HEAD at nodes A and C still indicates c1, and update d1 is pending. Additionally, prior to being powered off, update d1' was pending at node B. Node B's update is designated d1' because it is unknown if all of update d1 was performed (or just a portion thereof) before node B was powered down.

At 710, update d2 to the shared workspace occurs. Because of the high availability mode, updates are always permitted. Accordingly, nodes A and C begin performing the update d2. At 712, node C is powered off. Accordingly, at 714, node A detects that node C is no longer connected and updates its peer set to include only itself. Additionally, updates d1 and d2 are pending at node A. Node C may be powered off before completion of the update d2, and thus the updates pending at node C are designated as d1 and d2'.

At 716, update d3 to the shared workspace of node A occurs. Node A begins performing the update d3. At 718, node A is powered off. Prior to being powered off, there was no commitment and no additional update. Accordingly, at 720, node A's peer set includes node A and updates d1, d2, and d3' are pending, node B's peer set includes nodes A, B and C and update d1' is pending, and node C's peer set includes nodes A and C and updates d1 and d2' are pending.

At 722, node B is powered on. At 724, node B commits its workspace to the repository in response to detecting a power-up operation (or an initialization operation). The commit is represented by c2=c1+d1'. Node B adds an entry corresponding to c2 to the tree data and designates the entry as the HEAD. Additionally, node B detects that it is no longer peered with nodes A and C and changes the peer set to indicate that node B has no peers. For example, node B may update peer data stored at node B to indicate that no other nodes are in the peer set. At 726, update d4 to the shared workspace of node B occurs. Node B begins performing the update d4. At 728, node B's peer set indicates only node B (e.g., no other nodes) and the update d4 is pending.

At 730, node A is powered on. Accordingly, at 732, node A commits its workspace to the repository in response to detecting a power-up condition (or an initialization operation). The commit is represented by c3=c1+d1+d2+d3. Node A adds an entry corresponding to c3 to the tree data and designates the entry as the HEAD. Additionally, node B commits its workspace to the repository. The commit is represented by c4=c2+d4. Node B adds an entry corresponding to c4 to the tree data and designates the entry as the HEAD.

At 734, node A detects that it is connected with node B and updates its peer set to include node B. Node B similarly detects that it has reconnected with node A and updates its peer set to include node A. Additionally, nodes A and B perform synchronization. As part of synchronization, node A and node B determine a survivor node in accordance with a LAST setting (a setting indicating that the last member of a peer set is selected as the survivor node). Nodes A and B share peer data and determine that node A was the last member of an active peer set, thus node A is selected as the survivor node. Node B sends a request to node A for the shared workspace, and node A provides the workspace corresponding to c3 to node B. Node B overwrites the data stored in its workspace with the data from node A and commits the workspace to the repository. The commit is represented by c3. Node B also creates a branch in the tree data in response to determining that Node B is not the survivor. To illustrate, node B adds an entry for c3 to the tree-data as a new branch off of the entry for c1, such that the entry for c3 is on a different branch than the entries for c2 and c4 (e.g., the branch is off of c1 because c1 was the last commit while node B was connected to node A). Node B designates the entry for c3 to be the HEAD. Because c4 includes additional data (e.g., d4) that is not included in c3, c4 may be used for data reconciliation, as further described with reference to FIG. 9.

At 736, update d5 occurs. Nodes A and B begin performing the update d5. Accordingly, at 738, the peer sets of node A and B include two nodes (nodes A and B), and update d5 is pending. At 740, node C is powered on. Accordingly, at 742, node C commits its workspace to the repository in response to detecting a power-up condition (or an initialization operation). The commit is represented by c5=c1+d1+d2'. Node C adds an entry corresponding to c5 to the tree data and designates the entry as the HEAD. Additionally, nodes A and B commit their workspaces to their repositories. These commits are represented by c6=c3+d5. Nodes A and B add entries corresponding to c6 to their tree data and designate the entries as the HEAD.

At 744, node C detects connection with nodes A and B, and nodes A and B detect connection with node C. Node C updates its peer set to include nodes A and B, and nodes A and B update their peer set to include node C. Additionally, nodes A, B, and C perform synchronization. As part of synchronization, nodes A, B, and C determine a survivor node in accordance with a LAST setting (a setting indicating that the last member of a peer set is selected as the survivor node). Nodes A, B, and C share peer data and determine that node A was the last member of a peer set, thus node A is selected as the survivor node. Node C sends a request to node A for the shared workspace, and node A provides the workspace corresponding to c6 to node C. Node C overwrites the data stored in its workspace with the data from node A and commits the workspace to the repository. The commit is represented by c6. Node C also creates a branch in the tree data in response to determining that Node C is not the survivor. To illustrate, node C adds an entry for c6 to the tree-data as a new branch off of the entry for c1, such that the entry for c5 and the entry for c6 are on different branches. Node C designates the entry for c6 to be the HEAD. If c5 included additional data that is not included in c6, c5 could be used for data reconciliation. At this point, nodes A, B, and C are each configured to allow updates to modify the respective workspace. For example, at 746, update d6 occurs and is applied to the workspaces of the nodes A, B, and C.

FIG. 7 also illustrates a combined directed acyclic graph 790 indicative of versions of a workspace and relationships between the versions. The combined directed acyclic graph 790 is based on tree data stored at the three nodes A, B, and C, although each node may only store data indicative of a portion of the combined acyclic graph 790 (e.g., each node may store tree data indicative of branches created at the respective node, and not branches created at the other nodes). To illustrate, the tree data stored at node A includes the entries corresponding to c1 (added at 702), c3 (added at 732), and c6 (added at 742). The tree data stored at node B includes the entries corresponding to c1 (added at 702), c2 (added at 724), c4 (added at 732), c3 (added at 734), and c6 (added at 742). The tree data stored at node C includes the entries corresponding to c1 (added at 702), c5 (added at 742), and c6 (added at 744).

Figure 8:
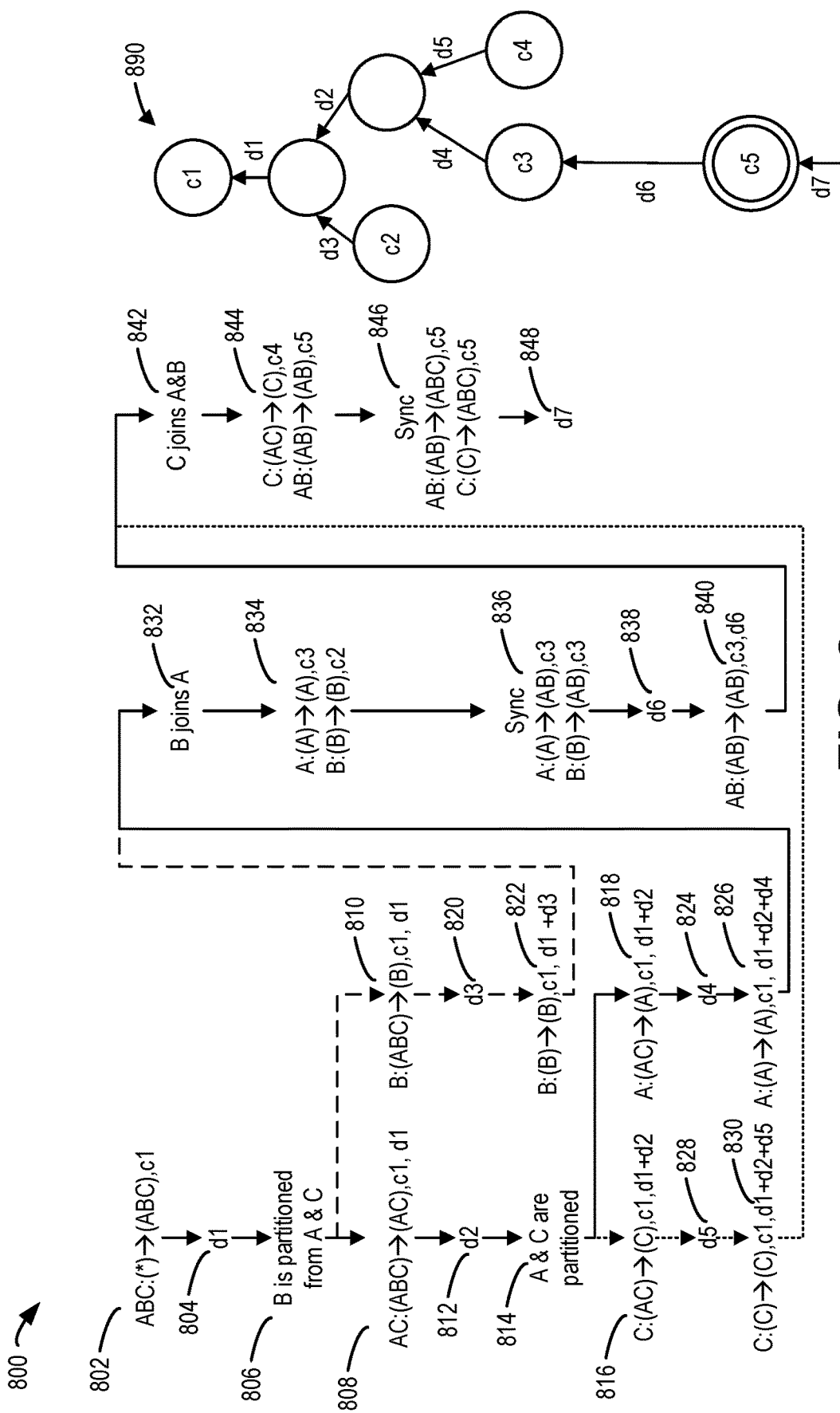
FIG. 8 illustrates a fifth example of operations of devices of a distributed data management system in accordance with aspects of the present disclosure.

Referring to FIG. 8, a fifth example of operations of devices of a distributed data management system is shown and generally designated 800. FIG. 8 illustrates operations of a first node ("node A"), a node device ("node B"), and a third node ("node C"). In a particular implementation, node A, node B, and node C include or correspond to the first computing device 102, the second computing device 152, and the third computing device 192 of FIGS. 1 and 2, respectively. In the fifth example 800, the files are synchronized in accordance with a high availability mode that allows updates to be applied to a workspace regardless of a number of nodes in a peer set. Additionally, the survivor node is determined in FIG. 8 as the LAST node remaining in a previous peer set. In other implementations, the survivor node is determined in accordance with a FIRST setting in which an arbitrary node is selected from a majority set of nodes that are already peers (e.g., that are already synchronized), and if no majority exists, an arbitrary node is selected as the survivor node.

At 802, node A, node B, and node C join a peer set and store identical copies of replicated data, which are committed as c1. Thus, at this point in time, the files in the workspace at node A, the files in the workspace at node B, and the files in the workspace at node C are the same, and are indicated by the HEAD c1. Each of the nodes A, B, and C store tree data indicating an entry for version c1, and that entry is designated the HEAD. The previous peer sets of nodes A, B, and C are indicated by (*).

At 804, update d1 to the shared workspace occurs. Due to the use of safe writes, nodes A, B, and C begin performing the update d1 at the respective workspaces. At 806, node B is partitioned from nodes A and C (but remains powered). Node B is partitioned after completion of the update d1 at node B's workspace. Accordingly, at 808, the peer sets of nodes A and C change to include only nodes A and C (and not node B), and at 810 node B's peer set is changed to include only node B. Nodes A and C may update peer data to indicate that node B is no longer in the peer set, and node B may update peer data to indicate that nodes A and C are no longer in the peer set. Because no commitment has occurred since 802, the HEAD at nodes A, B, and C still indicates c1, and update d1 is pending.

At 820, update d3 to the workspace of node B occurs. Node B begins performing the update d3. Accordingly, at 822, the updates d1 and d3 are pending, and c1 remains the HEAD. At 812, update d2 to the workspaces of node A and node C occurs. Nodes A and C begin performing the update d2. At 814, nodes A and C are partitioned. Accordingly, at 818, node A detects that node C is no longer connected and updates its peer set to include only itself. Additionally, updates d1 and d2 are pending at node A. At 816, node C detects that node A is no longer connected and updates its peer set to include only itself. Additionally, updates d1 and d2 are pending at node C.

At 824, update d4 to the workspace of node A occurs. Node A begins performing the update d4. Accordingly, at 826, the updates d1, d2, and d4 are pending at node A, and c1 remains the HEAD. At 828, update d5 to the workspace of node C occurs. Node C begins performing the update d5. Accordingly, at 830, the updates d1, d2, and d5 are pending at node C, and c1 remains the HEAD.

At 832, node B joins (e.g., reconnects) with node A. Accordingly, at 834, nodes A and B determine an increase to the peer sets and commit their respective workspaces. Node A's commit is represented by c3=c1+d1+d2+d4, and node B's commit is represented by c2=c1+d1+d3. Node A adds an entry corresponding to c3 to the tree data and designates the entry as the HEAD, and node B adds an entry corresponding to c2 to the tree data and designates the entry as the HEAD.

At 836, node A detects that it is connected with node B and updates its peer set to include node B. Node B similarly detects that it has reconnected with node A and updates its peer set to include node A. Additionally, nodes A and B perform synchronization. As part of synchronization, node A and node B determine a survivor node in accordance with a LAST setting (a setting indicating that the last member of an active peer set is selected as the survivor node). Nodes A and B share peer data and determine that node A was the last member of an active peer set, thus node A is selected as the survivor node. Node B sends a request to node A for the shared workspace, and node A provides the workspace corresponding to c3 to node B. Node B overwrites the data stored in its workspace with the data from node A and commits the workspace to the repository. The commit is represented by c3. The entry for c3 is added to a new branch off of the entry for c3. Node B designates the entry for c3 to be the HEAD. Because c2 includes additional data that is not included in c3, node B generates difference data based on the difference between c3 and c2 and provides the difference data to an application being executed at node B. The application determines whether to generate one or more updates that include the data indicated by the difference data in order to prevent data loss during reconciliation.

At 838, update d6 to the workspaces of nodes A and B occurs. Nodes A and B begin performing the update d6. Accordingly, at 840, update d6 is pending to c3 at nodes A and B. At 842, node C joins (e.g., reconnects) with nodes A and B. Accordingly, at 844, node C commit its workspace to the repository in response to detecting an increase in the peer set. Node C's commit is represented by c4=c1+d1+d2+d5. Node C adds an entry corresponding to c4 to the tree data and designates the entry as the HEAD. Additionally, nodes A and B commit their workspaces to their repositories. These commits are represented by c5=c3+d6. Nodes A and B add entries corresponding to c5 to their tree data and designate the entries as the HEAD.

At 846, node C detects connection with nodes A and B, and nodes A and B detect connection with node C. Node C updates its peer set to include nodes A and B, and nodes A and B update their peer set to include node C. Additionally, nodes A, B, and C perform synchronization. As part of synchronization, nodes A, B, and C determine a survivor node in accordance with a LAST setting (a setting indicating that the last member of a peer set is selected as the survivor node). Nodes A, B, and C share peer data and determine that node A was the last member of a peer set, thus node A is selected as the survivor node. Node C sends a request to node A for the shared workspace, and node A provides the workspace corresponding to c5 to node C. Node C overwrites the data stored in its workspace with the data from node A and commits the workspace to the repository. The entry for c5 is added to a new branch off of the entry for c1. Node C designates the entry for c5 to be the HEAD. Because c4 includes additional data that is not included in c5, node C generates difference data based on the difference between c4 and c5 and provides the difference data to an application being executed at node C. The application determines whether to generate one or more updates that include the data indicated by the difference data in order to prevent data loss during reconciliation. At this point, nodes A, B, and C may allow updates to modify the respective workspaces. For example, at 848, update d7 occurs and is applied to the workspaces of the nodes A, B, and C.

FIG. 8 also illustrates a combined directed acyclic graph 890 indicative of versions of a workspace and relationships between the versions. The combined directed acyclic graph 890 is based on tree data stored at the three nodes A, B, and C, although each node may only store data indicative of a portion of the combined acyclic graph 890 (e.g., each node may store tree data indicative of branches created at the respective node, and not branches created at the other nodes). To illustrate, the tree data stored at node A includes the entries corresponding to c1 (added at 802), c3 (added at 834), and c5 (added at 844). The tree data stored at node B includes the entries corresponding to c1 (added at 802), c2 (added at 834), c3 (added at 836), and c5 (added at 644). The tree data stored at node C includes the entries corresponding to c1 (added at 802), c4 (added at 844), and c5 (added at 846). The empty entries in the directed acyclic graph 890 are for illustration.

Figure 9:
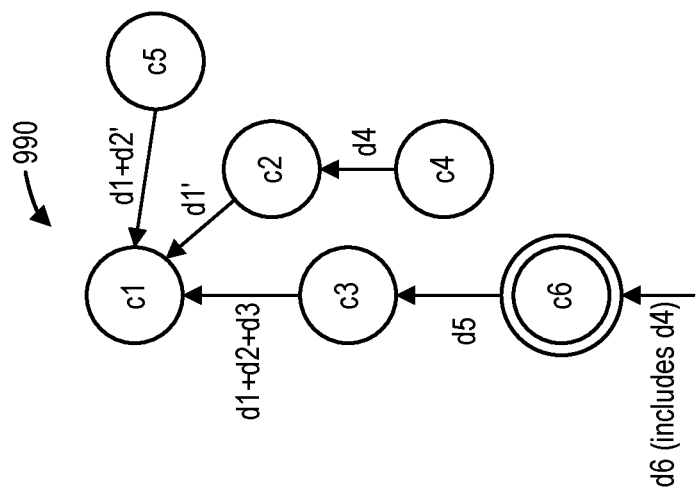
FIG. 9 is a directed acyclic graph indicative of an example of data reconciliation in accordance with aspects of the present disclosure.

Referring to FIG. 9, a combined directed acyclic graph 900 indicative of versions of a workspace and relationships between the versions for a distributed data management system across multiple devices is shown. The combined directed acyclic graph 900 is based on tree data stored at three nodes A, B, and C, although each node may only store data indicative of a portion of the combined acyclic graph 900 (e.g., each node may store tree data indicative of branches created at the respective node, and not branches created at the other nodes). The combined acyclic graph 900 corresponds to the operations described with reference to FIG. 7. However, with respect to FIG. 9, the nodes are configured to perform data reconciliation based on the tree-based version management scheme. For example, node B determines difference data indicating a difference between c4 and c3 after the branch with the entry corresponding to c3 is created (e.g., when node B and node A perform synchronization).

In a particular implementation, the difference data is provided to an application, and the application determines whether to generate an additional update to add data associated with an unused branch back to the main trunk. For example, the application may determine that update d4 added important data, and accordingly the application generates an update that includes d4 during a reconciliation operation. Although d4 is illustrated as being added with update d6 (e.g., after node C has synchronized with nodes A and B), in other examples, the application may generate an update including d4 at the same time (or a nearby time) as the update d5 (e.g., after node A and node B perform synchronization). In an alternate implementation, the tree data is stored at each node, but the difference data is not generated and provided to the application. Instead, applications are programmed to access the repository of the node that executes the application in order to extract the difference data.

Figure 10:
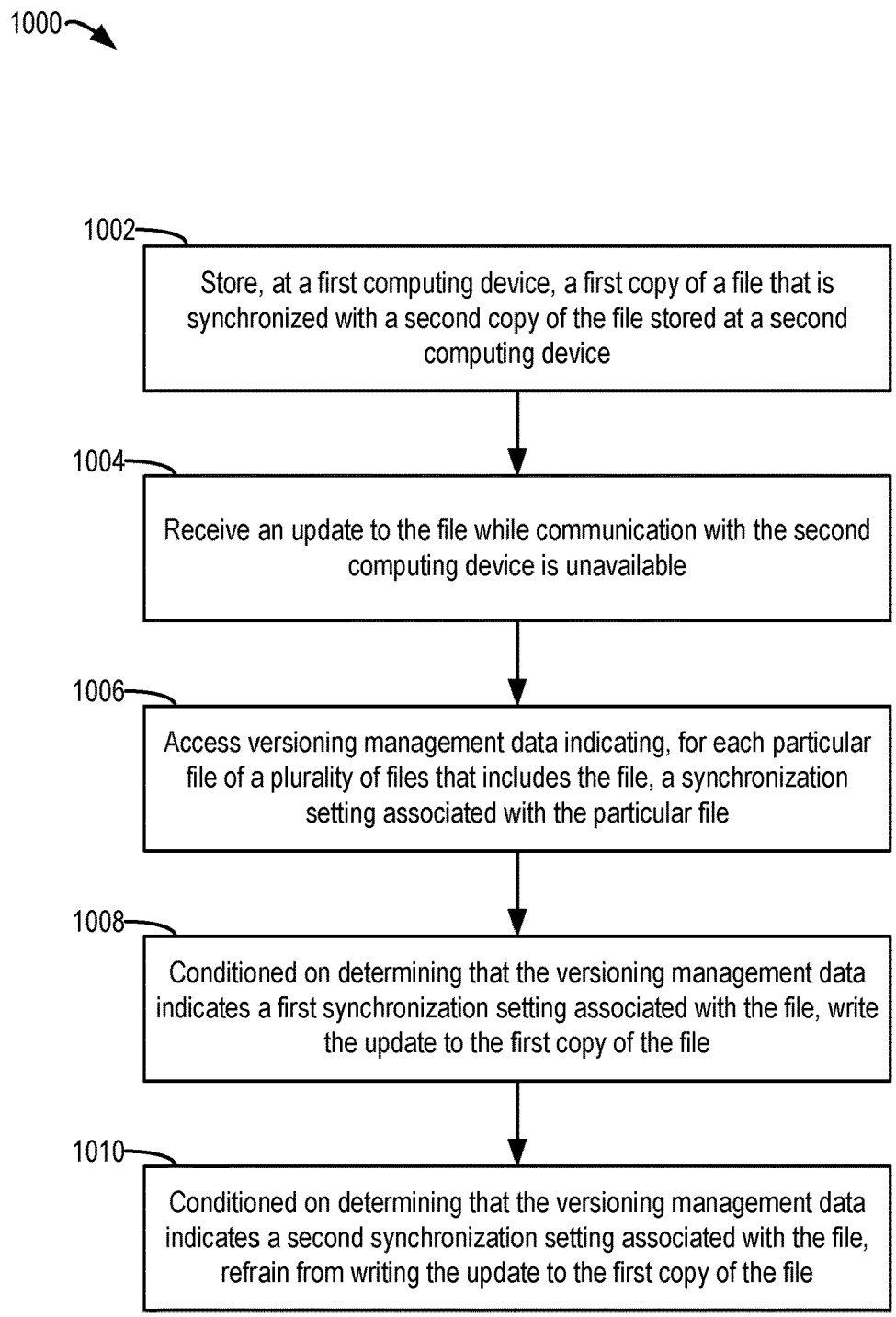
FIG. 10 is a flow chart of an example of a method of performing data synchronization on a per-file or per-directory basis.

FIG. 10 illustrates a method 1000 of performing data synchronization. In some implementations, the method 1000 is performed by the first computing device 102, the second computing device 152, or the third computing device 192 of FIGS. 1 and 2, as non-limiting examples.

The method 1000 includes storing, at a first computing device, a first copy of a file that is synchronized with a second copy of the file stored at a second computing device, at 1002. For example, the first computing device may include or correspond to the first computing device 102, the first copy of the file may include or correspond to the first copy 107 of the file, the second copy of the file may include or correspond to the second copy 157 of the file, and the second computing device may include or correspond to the second computing device 152.

The method 1000 includes receiving an update to the file while communication with the second computing device is unavailable, at 1004. For example, the update may include or correspond to the update 115, which is received by the processor 103 (e.g., the data manager 104) while the interface 108 is unable to connect to the second computing device 152.

The method 1000 includes accessing versioning management data indicating, for each particular file of a plurality of files that includes the file, a synchronization setting associated with the particular file, at 1006. For example, the versioning management data may include or correspond to the versioning management data 117 that includes the synchronization setting 121. In a particular implementation, the versioning management data includes synchronization settings that correspond to individual files. In other implementations, the versioning management data includes synchronization settings that correspond to directories.

The method 1000 includes, conditioned on determining that the versioning management data indicates a first synchronization setting associated with the file, writing the update to the first copy of the file, at 1008. To illustrate, the update 115 is written to the first copy 107 of the file in the workspace 105 conditioned upon the synchronization setting being a high availability setting, as a non-limiting example.

The method 1000 further includes, conditioned on determining that the versioning management data indicates a second synchronization setting associated with the file, refraining from writing the update to the first copy of the file, at 1010. To illustrate, the update 115 is not written to the first copy 107 of the file in the workspace 105 conditioned upon the synchronization setting being a quorum setting and the first computing device 102 not being a part of a quorum, as a non-limiting example.

In a particular implementation, the method 1000 includes, in response to detecting a reconciliation phase, storing the first copy of the file as a first version of the file, determining that communication is available with a first set of computing devices, the first set of computing devices including the second computing device, and updating peer data to indicate the first set of computing devices. For example, the first version of the file may include or correspond to the first version 111. The reconciliation event may be detected in response to detecting that communication with the second computing device is restored or in response to detecting a power-up event, as non-limiting examples. In this implementation, the method 1000 further includes receiving additional peer data from each of the first set of computing devices and selecting the second computing device from the first set of computing devices based on the peer data, the additional peer data, and a reconciliation setting associated with the file. For example, the reconciliation setting may include or correspond to the reconciliation setting 223. In this particular implementation, the method 1000 further includes sending a request for a second version of the file to the second computing device, receiving data from the second computing device responsive to the request, and storing the data as the second version of the file. For example, the request may include or correspond to the request 241, and the data may include or correspond to the data 243. In some implementations, the method 1000 further includes, in response to detecting a change in communication status of a particular computing device, updating the peer data to indicate the communication status.

The method 1000 enables thus enables synchronization to be performed on a per-file (or per-application) basis. Accordingly, the method 1000 is suitable for execution on a vehicle-based distributed data management system, such as a distributed aircraft system, or on IoT devices.

In a particular implementation, one or more of the elements of the method 1000 of FIG. 10 may be performed by a processor that executes instructions stored on a non-transitory, computer readable medium. For example, a non-transitory computer readable medium may store instructions that, when executed by a processor, cause the processor to perform operations including storing, at a first computing device, a first copy of a file that is synchronized with a second copy of the file stored at a second computing device. The operations include, in response to receiving an update to the file while communication with the second computing device is unavailable, accessing versioning management data indicating, for each particular file of a plurality of files that includes the file, a synchronization setting associated with the particular file. The operations include, conditioned on determining that the versioning management data indicates a first synchronization setting associated with the file, writing the update to the first copy of the file. The operations further include conditioned on determining that the versioning management data indicates a second synchronization setting associated with the file, refraining from writing the update to the first copy of the file.

Figure 11:
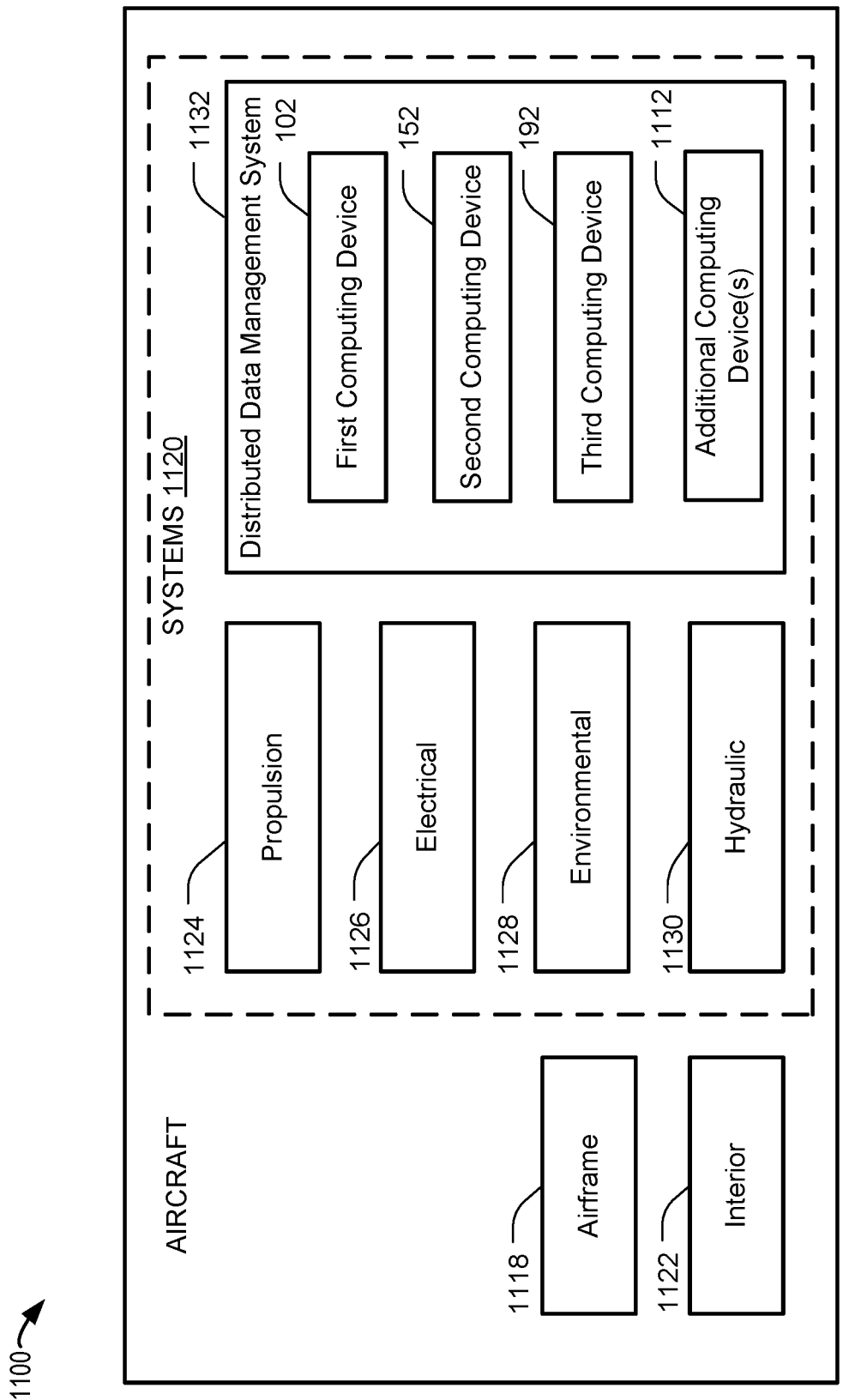
FIG. 11 is a block diagram of an aircraft including a distributed data management system including the computing devices of FIGS. 1 and 2.

Aspects of the disclosure may be described in the context of an aircraft 1100 as shown in FIG. 11. The aircraft 1100 may include a distributed data management system 1132 that includes the first computing device 102, the second computing device 152, the third computing device 192, and one or more optional additional computing devices 1112. As shown in FIG. 11, the aircraft 1100 also includes an airframe 1118 with a plurality of systems 1120 and an interior 1122. Examples of high-level systems 1120 include one or more of a propulsion system 1124, an electrical system 1126, a hydraulic system 1128, an environmental system 1130, and the distributed data management system 1132. Other systems may also be included. Although the distributed data management system 1132 is illustrated as a separate system, in other implementations, the distributed data management system 1132 may encompass or be included within one or more of the systems 1124-1130. Although an aerospace example is shown, the present disclosure may be applied to other industries. For example, the distributed data management system 1132 may be used onboard a manned or unmanned vehicle (such as a satellite, a watercraft, or a land-based vehicle), in a building or other structure.

Although one or more of FIGS. 1-11 illustrate systems, apparatuses, and/or methods according to the teachings of the disclosure, the disclosure is not limited to these illustrated systems, apparatuses, and/or methods. One or more functions or components of any of FIGS. 1-11 as illustrated or described herein may be combined with one or more other portions of another of FIGS. 1-11. For example, one or more elements of the method 300 of FIG. 3 may be performed in combination with one or more elements of the method 1000 of FIG. 10 or with other operations described herein. Accordingly, no single implementation described herein should be construed as limiting and implementations of the disclosure may be suitably combined without departing form the teachings of the disclosure. As an example, one or more operations described with reference to FIG. 3 or 10 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A computing device for a distributed data management system, the computing device comprising:
an interface configured to communicate with a second computing device of the distributed data management system;
a memory configured to store a first copy of a file that is synchronized with a second copy of the file stored at the second computing device; and
a processor configured, in response to receipt of an update to the file at the processor while the interface is unable to communicate with the second computing device, to:
access a synchronization setting for the file from versioning management data in the memory, the versioning management data including synchronization settings for each particular file of a plurality of files that includes the file, wherein the synchronization settings indicate conditions for preventing updating of files, wherein the plurality of files include a first file having a first synchronization setting in the versioning management data that enables the first file to be updated when the interface attempts to communicate with the second computing device and is unable to communicate with the second computing device, wherein the plurality of files include a second file having a second synchronization setting in the versioning management data that prevents the second file from being updated when the interface attempts to communicate with the second computing device and is unable to communicate with the second computing device, and wherein the update changes the file from a first version to a second version that is distinct from the first version;
  conditioned on a determination that the versioning management data indicates the first synchronization setting is associated with the file, write the update to the first copy of the file; and
  conditioned on a determination that the versioning management data indicates the second synchronization setting is associated with the file, refrain from performance of a write of the update to the first copy of the file.

2. The computing device of claim 1, wherein the versioning management data indicates a synchronization setting associated with a directory of files that includes the file.

3. The computing device of claim 2, wherein the processor is further configured to, in response to receiving an update to a third file of the directory of files while the interface is unable to communicate with the second computing device:
  conditioned on determining that the versioning management data indicates a first particular synchronization setting associated with the directory of files, write the update to a first particular copy of the third file; and
  conditioned on determining that the versioning management data indicates a second particular synchronization setting associated with the directory of files, refrain from writing the update to the first particular copy of the third file.

4. The computing device of claim 1, wherein the processor is further configured, in response to detecting that the interface is able to communicate with the second computing device subsequent to writing the update to the first copy of the file:
  conditioned on determining that the versioning management data indicates a first reconciliation setting associated with the file, send an update message to the second computing device, wherein the update message indicates the update to the first copy of the file; and
  conditioned on determining that the versioning management data indicates a second reconciliation setting, send a request for updated data to the second computing device, the updated data indicating changes to the second copy of the file.

5. The computing device of claim 1, wherein the processor is configured to write the update to the first copy of the file in response to determining that the first synchronization setting corresponds to a quorum mode and detecting that the interface is able to communicate with at least a threshold number of a plurality of computing devices, wherein the plurality of computing devices includes the second computing device and one or more additional computing devices.

6. The computing device of claim 1, wherein the processor is configured to write the update to the first copy of the file in response to determining that the first synchronization setting corresponds to a high availability mode.

7. The computing device of claim 1, wherein the processor is configured to refrain from writing the update to the first copy of the file in response to determining that the second synchronization setting corresponds to a quorum mode and detecting that the interface is able to communicate with fewer than a threshold number of a plurality of computing devices, wherein the plurality of computing devices includes the second computing device and one or more additional computing devices.

8. The computing device of claim 1, wherein the interface is unable to communicate with the second computing device responsive to the computing device being disconnected from a network, the second computing device being disconnected from the network, the second computing device being powered down, or a combination thereof.

9. The computing device of claim 1, wherein the processor is further configured to, during a reconciliation phase, determine, at a first time, that the interface is able to communicate with a first set of computing devices that includes the second computing device, and wherein the memory is configured to store peer data indicating that the interface is able to communicate with the first set of computing devices at the first time.

10. The computing device of claim 9, wherein the processor is configured to detect the reconciliation phase in response to detecting an initialization phase of the processor, detecting that communication is restored with the second computing device, or both.

11. The computing device of claim 9, wherein the processor is further configured, during the reconciliation phase, to:
  store the first copy of the file in the memory as a first version of the file;
  receive additional peer data from each of the first set of computing devices;
  select the second computing device from the first set of computing devices based on the peer data, the additional peer data, and a reconciliation setting associated with the file;
  send a request for a second version of the file to the second computing device;
  receive data from the second computing device responsive to the request; and
  store the data in the memory as the second version of the file.

12. The computing device of claim 11, wherein the processor is further configured, during the reconciliation phase, to provide particular data indicating a difference between the first version of the file and the second version of the file to one or more applications.

13. A method of distributed data management, the method comprising:
  storing, at a first computing device, a first copy of a file that is synchronized with a second copy of the file stored at a second computing device; and
  in response to receiving an update to the file at the first computing device while communication with the second computing device is unavailable:
    accessing a synchronization setting for the file from versioning management data, the versioning management data including synchronization settings for each particular file of a plurality of files that includes the file, wherein the synchronization settings indicate conditions for preventing updating of files, wherein the plurality of files include a first file having a first synchronization setting in the versioning management data that enables the first file to be updated when the first computing device attempts to communicate with the second computing device and is unable to communicate with the second computing device, wherein the plurality of files include a second file having a second synchronization setting in the versioning management data that prevents the second file from being updated when the first computing device attempts to communicate with the second computing device and is unable to communicate with the second computing device, and wherein the update changes the file from a first version to a second version that is distinct from the first version;

conditioned on determining that the versioning management data indicates the first synchronization setting is associated with the file, writing the update to the first copy of the file; and conditioned on determining that the versioning management data indicates the second synchronization setting is associated with the file, refraining from writing the update to the first copy of the file.

14. The method of claim 13, further comprising, in response to detecting a reconciliation phase:

storing the first copy of the file as a first version of the file;

determining that communication is available with a first set of computing devices, the first set of computing devices including the second computing device;

updating peer data to indicate the first set of computing devices;

receiving additional peer data from each of the first set of computing devices;

selecting the second computing device from the first set of computing devices based on the peer data, the additional peer data, and a reconciliation setting associated with the file;

sending a request for a second version of the file to the second computing device;

receiving data from the second computing device responsive to the request; and storing the data as the second version of the file.

15. The method of claim 14, further comprising, in response to detecting a change in communication status of a particular computing device, updating the peer data to indicate the communication status.

16. The method of claim 14, wherein the reconciliation phase is detected in response to detecting that communication with the second computing device is restored.

17. The method of claim 14, wherein the reconciliation phase is detected in response to detecting a power-up event.

18. A non-transitory computer-readable medium of a first computing device comprising instructions executable by a processor to:

store a first copy of a file that is synchronized with a second copy of the file stored at a second computing device; and in response to receiving an update to the file at the first computing device while communication with the second computing device is unavailable:

accessing a synchronization setting for the file from versioning management data, the versioning management data including synchronization settings for each particular file of a plurality of files that includes the file, wherein the synchronization settings indicate conditions for preventing updating of files, wherein the plurality of files include a first file having a first synchronization setting in the versioning management data that enables the first file to be updated when the first computing device attempts to communicate with the second computing device and is unable to communicate with the second computing device, wherein the plurality of files include a second file having a second synchronization setting in the versioning management data that prevents the second file from being updated when the first computing device attempts to communicate with the second computing device and is unable to communicate with the second computing device, and wherein the update changes the file from a first version to a second version that is distinct from the first version;

conditioned on determining that the versioning management data indicates the first synchronization setting is associated with the file, write the update to the first copy of the file; and conditioned on determining that the versioning management data indicates the second synchronization setting is associated with the file, refrain from performance of a write of the update to the first copy of the file.

19. The non-transitory computer-readable medium of claim 18, wherein the instructions are further executable by the processor to, in response to detection that the first computing device is able to communicate with the second computing device subsequent to a write of the update to the first copy of the file, send an update message to the second computing device conditioned on a determination that the versioning management data indicates a first reconciliation setting associated with the file, wherein the update message indicates the update to the first copy of the file.

20. The non-transitory computer-readable medium of claim 18, wherein the first computing device corresponds to a first line replaceable unit of an aircraft, and wherein the second computing device corresponds to a second line replaceable unit of the aircraft.

* * * * *